(12) United States Patent
Matsunaga

(10) Patent No.: US 10,084,671 B2
(45) Date of Patent: Sep. 25, 2018

(54) COMMUNICATION DEVICE AND PACKET MONITORING METHOD

(71) Applicant: SONY CORPORATION, Tokyo (JP)

(72) Inventor: Osamu Matsunaga, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/100,709

(22) PCT Filed: Dec. 9, 2014

(86) PCT No.: PCT/JP2014/082532
§ 371 (c)(1),
(2) Date: Jun. 1, 2016

(87) PCT Pub. No.: WO2015/093345
PCT Pub. Date: Jun. 25, 2015

(65) Prior Publication Data
US 2016/0301583 A1   Oct. 13, 2016

(30) Foreign Application Priority Data
Dec. 17, 2013   (JP) .................. 2013-260465

(51) Int. Cl.
*H04L 12/26* (2006.01)
*H04L 12/70* (2013.01)
(Continued)

(52) U.S. Cl.
CPC .......... *H04L 43/04* (2013.01); *H04L 41/0213* (2013.01); *H04L 41/0681* (2013.01);
(Continued)

(58) Field of Classification Search
None
See application file for complete search history.

(56) References Cited

U.S. PATENT DOCUMENTS

| | | |
|---|---|---|
| 2001/0021176 A1 | 9/2001 | Mimura et al. |
| 2002/0083199 A1* | 6/2002 | Dingsor .................. H04L 29/06 709/245 |

(Continued)

FOREIGN PATENT DOCUMENTS

| | | |
|---|---|---|
| EP | 2400701 A1 | 12/2011 |
| EP | 2493139 A1 | 8/2012 |

(Continued)

OTHER PUBLICATIONS

Written Opinion of the ISA, PCT/JP2014/082532, dated Oct. 3, 2015, Patent Cooperation Treaty, pp. 1-4.*

(Continued)

*Primary Examiner* — Jenee Holland
(74) *Attorney, Agent, or Firm* — Chip Law Group

(57) ABSTRACT

To provide a communication device that enables efficient monitoring of similar communication flows that are generated in a massive amount. Provided is a communication device, including a packet collection unit, a packet detection unit, a control information generation unit, and a communication control unit. The packet collection unit is configured to collect packets transmitted to a network and packets received from the network. The packet detection unit is configured to detect an opportunity to generate instruction information for instructing start and stop of recording packets exists by using the packets collected by the packet collection unit. The control information generation unit is configured to generate information for use in monitoring operation of packets and control information including the instruction information. The communication control unit configured to transmit the control information generated by the control information generation unit to another device connected to the network.

11 Claims, 16 Drawing Sheets

(51) Int. Cl.
*H04L 12/911* (2013.01)
*H04L 12/24* (2006.01)
(52) U.S. Cl.
CPC ............ *H04L 43/028* (2013.01); *H04L 43/08* (2013.01); *H04L 47/00* (2013.01); *H04L 47/70* (2013.01); *H04L 43/0823* (2013.01)

(56) References Cited

U.S. PATENT DOCUMENTS

| | | | | |
|---|---|---|---|---|
| 2003/0014650 | A1* | 1/2003 | Freed | H04L 29/06 713/189 |
| 2004/0111507 | A1* | 6/2004 | Villado | H04L 29/06 709/224 |
| 2004/0208189 | A1* | 10/2004 | Fukuda | H04L 12/1886 370/401 |
| 2004/0230703 | A1* | 11/2004 | Sukigara | H04L 29/1232 709/253 |
| 2005/0105474 | A1* | 5/2005 | Metzler | H04L 43/0835 370/252 |
| 2005/0128946 | A1* | 6/2005 | Murakami | H04L 12/2856 370/230 |
| 2007/0157018 | A1* | 7/2007 | Simon | H04M 11/04 713/100 |
| 2008/0208990 | A1* | 8/2008 | Andreasson | H04L 67/24 709/206 |
| 2008/0310319 | A1* | 12/2008 | Kitamura | H04L 12/4641 370/252 |
| 2010/0124177 | A1* | 5/2010 | Nishi | H04L 43/50 370/252 |
| 2010/0135160 | A1 | 6/2010 | Park et al. | |
| 2010/0254397 | A1* | 10/2010 | Nishi | H04L 41/12 370/401 |
| 2012/0311691 | A1* | 12/2012 | Karlin | H04L 63/0236 726/12 |

FOREIGN PATENT DOCUMENTS

| | | |
|---|---|---|
| JP | 2001-257722 A | 9/2001 |
| JP | 2002-064492 A | 2/2002 |
| JP | 2002-064507 A | 2/2002 |
| JP | 2005-294973 A | 10/2005 |
| JP | 2005-294974 A | 10/2005 |
| JP | 2010-250607 A | 11/2010 |
| WO | 2012/175363 A | 12/2012 |
| WO | 2012/175363 A1 | 12/2012 |

OTHER PUBLICATIONS

Shohei Sato et al., "Manet-Viewer II: A Visualization System for Visualizing Packet Flow in Mobile Ad-hoc Networks", The Institute of Electronics, Information and Communication Engineers, IEICE Technical Report AN2011-15, vol. 111, No. 139, Jul. 8, 2011, 8 pages.

Extended European Search Report of EP Patent Application No. 14870924.9, dated May 4, 2017, 07 pages.

Shohei Sato et al., "Manet-Viewer II: A Vsualization System for Visualizing Packet Flow in Mobile Ad-hoc Networks", IEICE Technical Report, vol. 111, No. 139, AN2011-15(Jul. 2011), Jul. 15, 2011, pp. 8.

\* cited by examiner

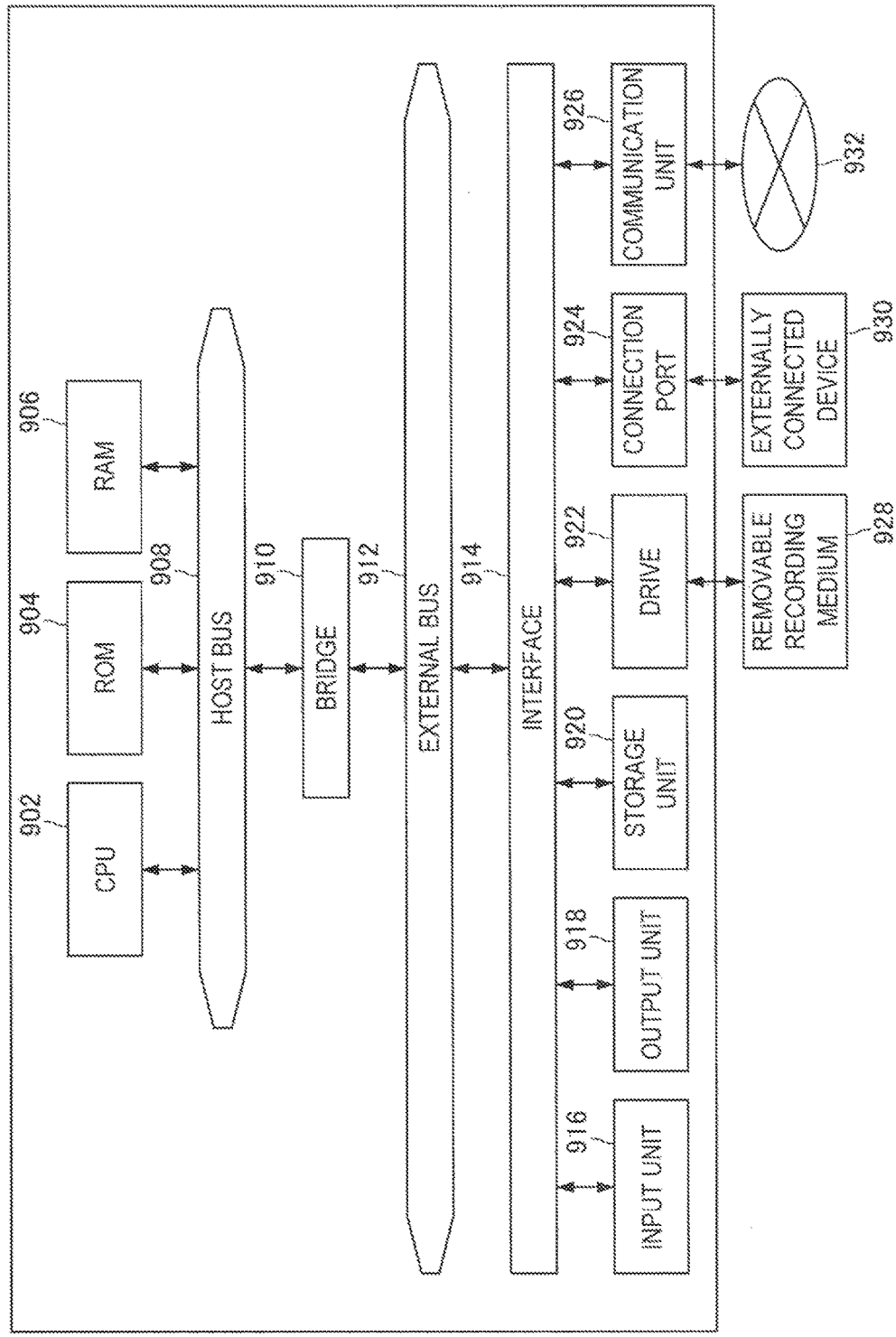

COMMUNICATION DEVICE AND PACKET MONITORING METHOD

CROSS REFERENCE TO RELATED APPLICATIONS

This application is a U.S. National Phase of International Patent Application No. PCT/JP2014/082532 filed on Dec. 9, 2014, which claims priority benefit of Japanese Patent Application No. JP 2013-260465 filed in the Japan Patent Office on Dec. 17, 2013. Each of the above-referenced applications is hereby incorporated herein by reference in its entirety.

TECHNICAL FIELD

The present disclosure relates to a communication device, a packet monitoring method, and a computer program.

BACKGROUND ART

Technologies for acquiring and retaining packets on a network in order to discover causes of trouble occurring on the network have been disclosed (for example, refer to Patent Literature 1, Patent Literature 2, Patent Literature 3, and Patent Literature 4). Since the storage capacity of a network monitoring device that acquires and retains packets on a network is limited, there has been a demand for not only a packet retaining function that enables acquisition and retaining of packets but also an overwriting prevention function that enables prevention of overwriting of packets when an error occurs on the network.

CITATION LIST

Patent Literature

Patent Literature 1: JP 2002-64492A
Patent Literature 2: JP 2002-64507A
Patent Literature 3: JP 2005-294973A
Patent Literature 4: JP 2005-294974A

SUMMARY OF INVENTION

Technical Problem

Such a network monitoring device with the packet retaining function further has to have functions other than the overwriting prevention function with respect to packet retaining data. Particularly, in a network system in which a plurality of data communication devices that have a network monitoring function are arranged on a network, a function of comprehensively managing and controlling the network monitoring function in order to cause the network monitoring to function effectively. Particularly, in a network system in which a plurality of data communication devices are arranged to communicate a plurality of different kinds of video data and audio data in massive amounts in real-time, efficient monitoring of states of the network has been strongly demanded.

Therefore, the present disclosure proposes a novel and advanced communication device, packet monitoring method, and computer program that enable efficient monitoring of similar communication flows that are generated in a massive amount.

Solution to Problem

According to the present disclosure, there is provided a communication device, including: a packet collection unit configured to collect packets transmitted to a network and packets received from the network; a packet detection unit configured to detect whether or not a packet that is an opportunity to generate instruction information for instructing start and stop of recording packets exists by using the packets collected by the packet collection unit; a control information generation unit configured to generate information for use in monitoring operation of packets and control information including the instruction information; and a communication control unit configured to transmit the control information generated by the control information generation unit to another device connected to the network.

According to the present disclosure, there is provided a packet monitoring method, including: collecting packets transmitted to a network and packets received from the network; detecting whether or not a packet that is an opportunity to generate instruction information for instructing start and stop of recording packets exists by using the collected packets; generating information for use in monitoring operation of packets and control information including the instruction information; and transmitting the generated control information to another device connected to the network.

According to the present disclosure, there is provided a computer program causing a computer to execute: collecting packets transmitted to a network and packets received from the network; detecting whether or not a packet that is an opportunity to generate instruction information for instructing start and stop of recording packets exists by using the collected packets; generating information for use in monitoring operation of packets and control information including the instruction information; and transmitting the generated control information to another device connected to the network.

Advantageous Effects of Invention

As described above, according to the present disclosure, it is possible to provide a novel and advanced communication device, packet monitoring method, and computer program that enable efficient monitoring of similar communication flows that are generated in a massive amount.

Note that the effect described above is not necessarily limiting, and along with or instead of the effect, any effect that is desired to be introduced in the present specification or other effects that can be expected from the present specification may be exhibited.

BRIEF DESCRIPTION OF DRAWINGS

FIG. 16 is an illustrative diagram showing a hardware configuration example.

DESCRIPTION OF EMBODIMENT(S)

Hereinafter, (a) preferred embodiment(s) of the present disclosure will be described in detail with reference to the appended drawings. In this specification and the drawings, elements that have substantially the same function and structure are denoted with the same reference signs, and repeated explanation is omitted.

Note that description will be provided in the following order.
1. Embodiment of the present disclosure
   1.1. System configuration example
   1.2. Configuration example of a communication device
   1.3. System operation example at the time of executing a network monitoring function
   1.4. Operation example of a communication device
2. Hardware configuration example
3. Conclusion

1. EMBODIMENT OF THE PRESENT DISCLOSURE

1.1. System Configuration Example

First Configuration Example

Figure 1:
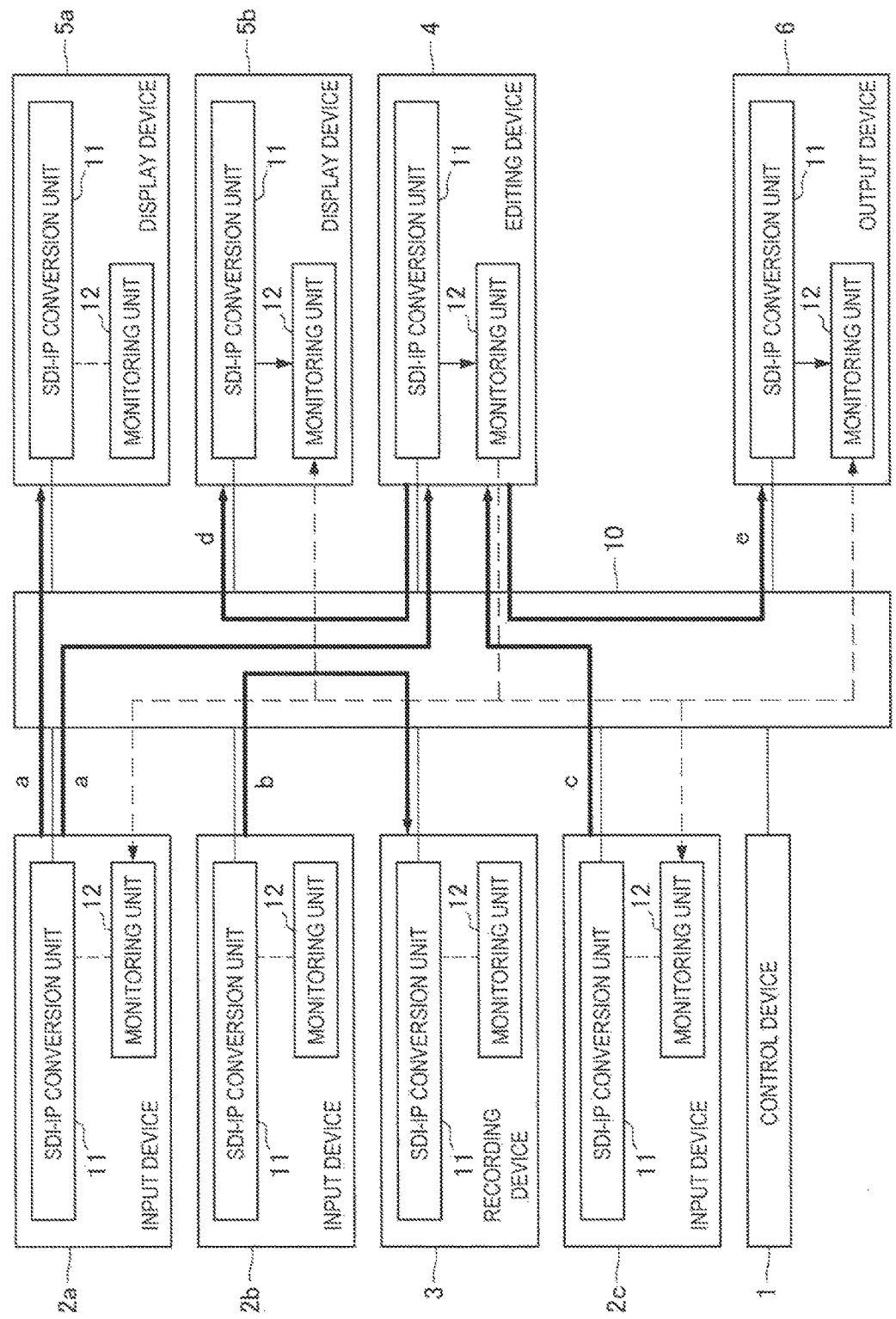
FIG. 1 is an illustrative diagram showing a configuration example of a video editing system according to an embodiment of the present disclosure.

First, an embodiment of the present disclosure will be described with reference to drawings. FIG. 1 is an illustrative diagram showing a configuration example of a video editing system according to an embodiment of the present disclosure. Hereinbelow, the configuration example of the video editing system according to the embodiment of the present disclosure will be described using FIG. 1.

The video editing system shown in FIG. 1 is configured to include a control device 1, input devices 2a, 2b, and 2c, a recording device 3, an editing device 4, display devices 5a and 5b, and an output device 6. The control device 1, the input devices 2a, 2b, and 2c, the recording device 3, the editing device 4, the display devices 5a and 5b, and the output device 6 are connected to one another on a network via a network switch group 10.

The control device 1 is a device that sets routes of communication flows between the respective devices. FIG. 1 exemplifies a state of five communication flows set by the control device 1, which includes a flow a transmitted from the input device 2a to the display device 5a and the editing device 4, a flow b transmitted from the input device 2b to the recording device 3, a flow c transmitted from the input device 2c to the editing device 4, a flow d transmitted from the editing device 4 to the display device 5b, and a flow e transmitted from the editing device 4 to the output device 6.

All of the input devices 2a, 2b, and 2c, the recording device 3, the editing device 4, the display devices 5a and 5b, and the output device 6 have a function of processing serial digital interface (SDI) signals. In addition, each of the input devices 2a, 2b, and 2c, the recording device 3, the editing device 4, the display devices 5a and 5b, and the output device 6 has an SDI-IP conversion unit 11 that converts SDI signals into Internet protocol (IP) signals and vice versa and a monitoring unit 12 that monitors states of the IP signals flowing on the network. The monitoring unit 12 sets all flows exchanged between the SDI-IP conversion units 11 and the network switch group 10 as monitoring targets.

The video editing system shown in FIG. 1 has to perform real-time signal processing. Thus, as communication protocols of the communication flows, a user datagram protocol (UDP) and a real-time transport protocol (RTP) are used. When the UDP and RTP are used as the communication protocols, redundant designing of a device or a route or installation of an error correction function is necessary in order to avoid deterioration in video quality attributable to a packet error, unlike a transmission control protocol (TCP). The redundant design or the error correction function has to be maintained in a range in which it works effectively by monitoring the severity of the error and the spot at which the error occurs in the individual communication flows at all times, while the video quality does not deteriorate due to an effective operation of the redundantly designed device or route or the error correction function.

FIG. 1 illustrates the state in which the monitoring unit 12 of the editing device 4 sets transmission and reception flows of its own device as monitoring targets and remotely sets the monitoring units 12 of each of the devices that relate to the transmission and reception flows as indicated by the dashed lines. In other words, since communication flows in which the editing device 4 is involved are a, c, d, and e, FIG. 1 illustrates the state in which the monitoring unit 12 of the editing device 4 remotely sets the monitoring units 12 of the input devices 2a and 2c, the display device 5b, and the output device 6 in FIG. 1.

In the example shown in FIG. 1, the editing device 4 executes monitoring of the reception states of the communication flow a and the communication flow c using its own monitoring unit 12, and remotely sets the monitoring unit 12 of the input device 2a that is a transmission source of the communication flow a to monitor the transmission state of the communication flow a. Likewise, with respect to the communication flow c, the monitoring unit remotely sets the monitoring unit 12 of the input device 2c to monitor the transmission state of the communication flow a, with respect to the communication flow d, remotely sets the monitoring unit 12 of the display device 5b to monitor the reception state of the communication flow d, and with respect to the communication flow e, remotely sets the monitoring unit 12 of the output device 6 to monitor the transmission state of the communication flow e.

When the flow a is focused, the transmission state from the input device 2a is monitored and the reception state of the editing device 4 is monitored. There are many common items to be set in the monitoring unit 12 of the input device 2a and the monitoring unit 12 of the editing device 4, beginning from network address information of the flow a that is a monitoring target.

The monitoring unit 12 executes an operation of recording packet data as a monitoring operation. The packet data recording operation executed by the monitoring unit 12 depends on the content of the items to be set in the monitoring unit 12. As the content of the items, there are settings of, for example, execution of periodic recording and analysis, a start of recording (overwriting recording) when a specific start condition is satisfied, a stop of recording (overwriting recording) when a specific stop condition is satisfied, and the like.

Note that the communication flow b between the input device 2b and the recording device 3 that has not been described above can likewise be remotely set as a monitoring target by the monitoring units 12 thereof.

As described above, by installing one of the monitoring units 12 which can perform remote controlling in each device that has the function of processing SDI signals, the video editing system according to the embodiment of the present disclosure can monitor the same communication flow at a plurality of places at the same time. By monitoring the same communication flow at the plurality of places at the same time, the video editing system according to the embodiment of the present disclosure can exhibit effects not only of specifying the cause of the occurrence of a fault but also of issuing a warning about a fault.

Figure 2:
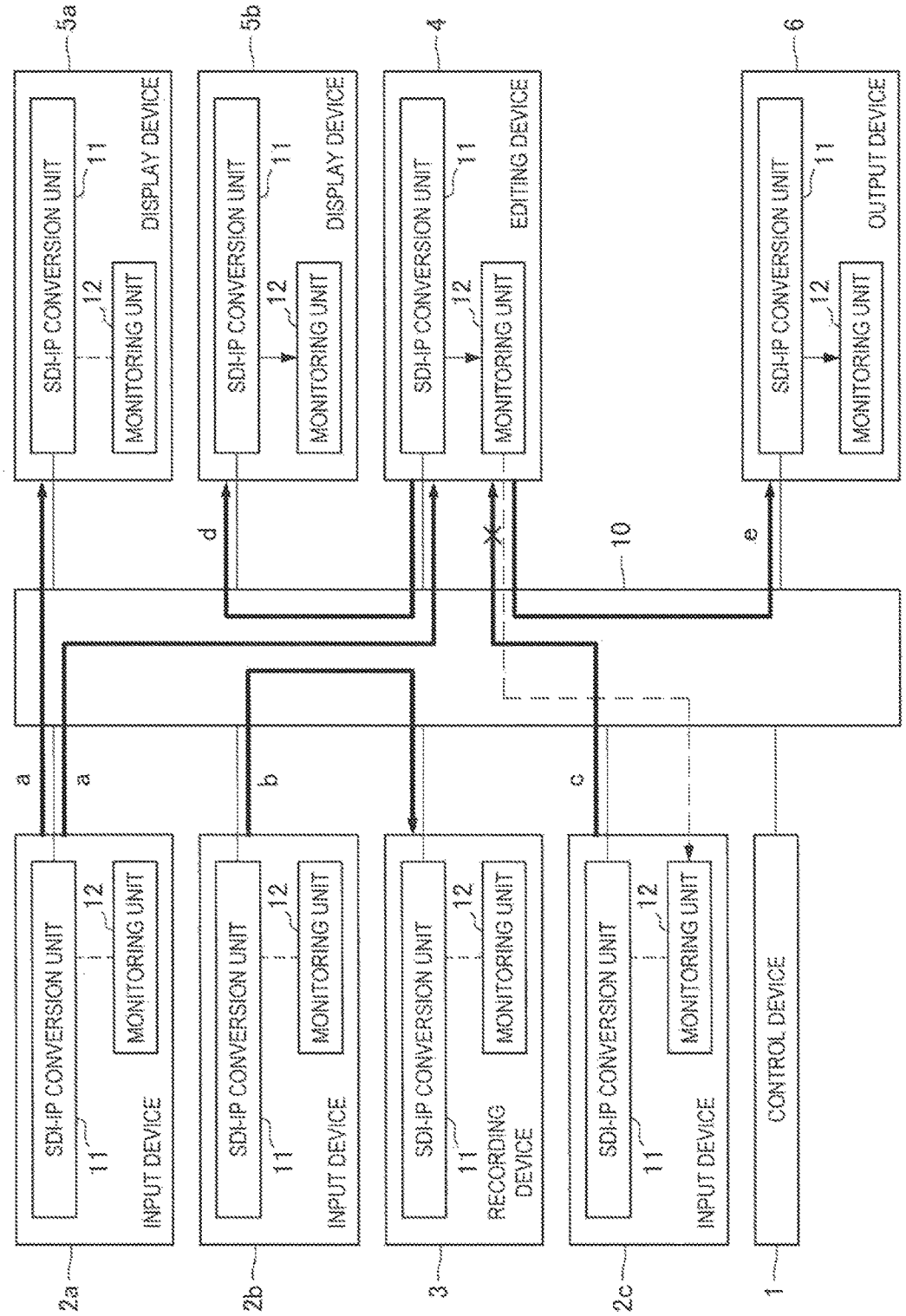
FIG. 2 is an illustrative diagram for describing an operation performed when a packet error is detected in the video editing system.

FIG. 2 is an illustrative diagram for describing an operation performed when a packet error is detected in the video editing system according to the embodiment of the present disclosure shown in FIG. 1. Hereinbelow, an operation performed when the monitoring unit 12 of the editing device 4 has detected a packet error in the communication flow c from the input device 2c to the editing device 4 will be described.

When a packet error has been detected in the communication flow c, the monitoring unit 12 of the editing device 4 remotely sets the monitoring unit 12 of the input device 2c to execute monitoring of the communication flow c as indicated by the dashed line of FIG. 2. When the monitoring unit 12 of the input device 2c has been set by the monitoring unit 12 of the editing device 4 to execute monitoring of the communication flow c, the monitoring unit 12 of the editing device 4 and the monitoring unit 12 of the input device 2c monitor the communication flow c at the same time thereafter.

As the monitoring unit 12 of the editing device 4 and the monitoring unit 12 of the input device 2c monitor the communication flow c at the same time, it is possible to determine whether or not packets corresponding to the packet error detected by the monitoring unit 12 of the editing device 4 have actually been transmitted from the input device 2c. Monitoring the communication flow c by the monitoring unit 12 of the editing device 4 and the monitoring unit 12 of the input device 2c at the same time contributes to the work of specifying the cause of the occurrence of a fault.

Note that the above description is based on the premise that items that should be set in the monitoring unit 12 of the input device 2c serving as a transmission source of the communication flow c are remotely set by the monitoring unit 12 of the editing device 4, but the execution of the monitoring operation is not instructed remotely by the monitoring unit 12 of the editing device 4. Then, when the monitoring unit 12 of the editing device 4 detects a packet error, the monitoring unit 12 of the editing device 4 is assumed to remotely instruct the monitoring unit 12 of the input device 2c to execute the monitoring operation.

It is also possible to set a different operation in the monitoring unit 12 of the input device 2c. For example, monitoring can be executed by a plurality of devices at the same time using the condition of receiving packets that support a change of a route setting as a start condition in order to ascertain whether or not packet errors tend to concentrate on the time point at which the route setting of a communication flow between the devices is changed.

Second Configuration Example

Figure 3:
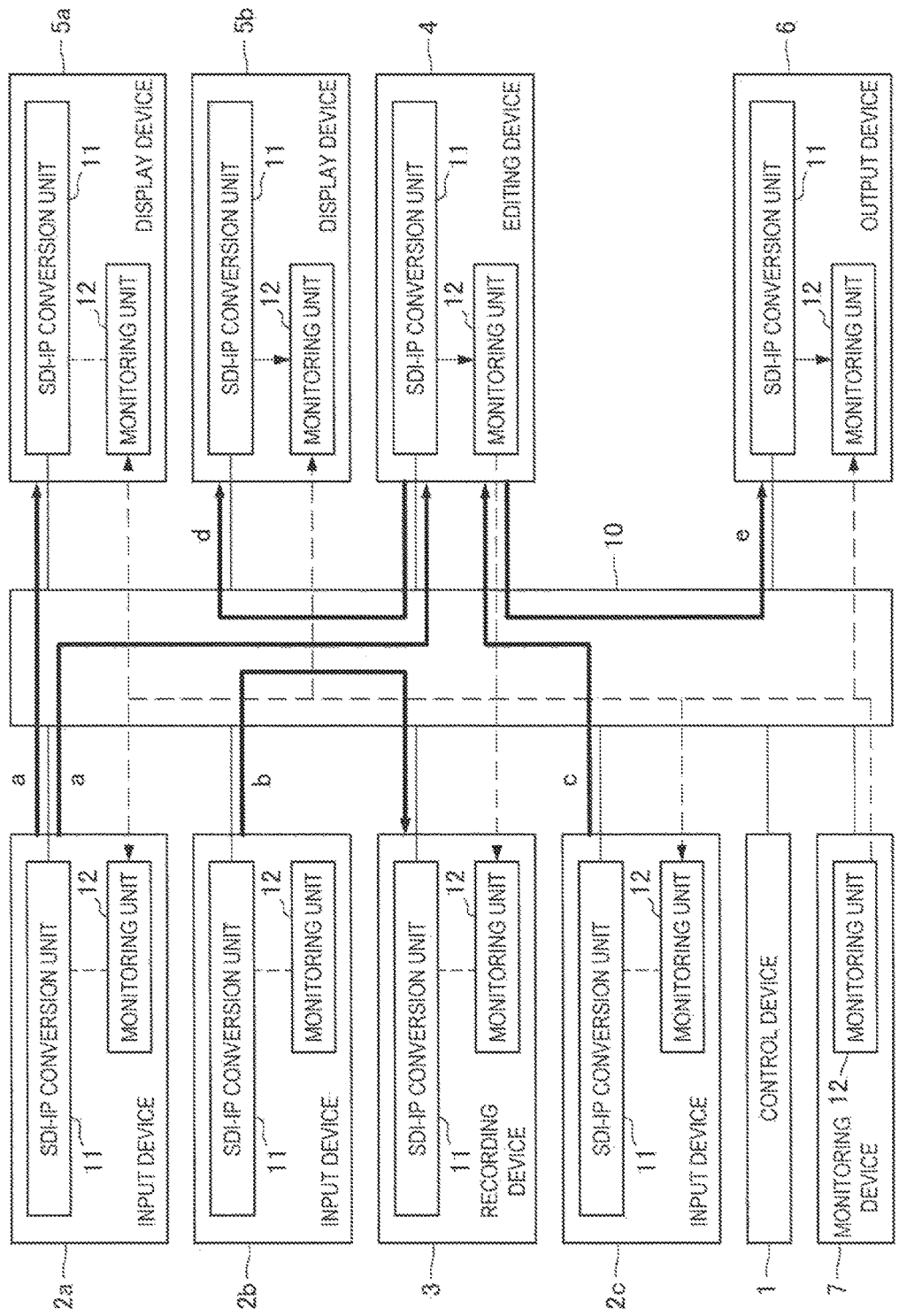
FIG. 3 is an illustrative diagram showing a configuration example of a video editing system according to an embodiment of the present disclosure.

Another example of the video editing system will be introduced. FIG. 3 is an illustrative diagram for describing a configuration example of a video editing system according to an embodiment of the present disclosure. Hereinbelow, the configuration example of the video editing system according to the embodiment of the present disclosure will be described using FIG. 3.

The video editing system according to the embodiment of the present disclosure shown in FIG. 3 is provided with a monitoring device 7 in addition to the video editing system shown in FIG. 1 as a monitoring dedicated device. The monitoring device 7 includes the monitoring unit 12 like other devices that have the function of processing SDI signals.

As shown in FIG. 3, when the monitoring device 7 is provided in the video editing system as a monitoring dedicated device, the monitoring units 12 of all the devices that have the function of processing SDI signals are remotely set. Note that information of the route of each communication flow which is necessary for the setting is acquired from the control device 1. In FIG. 3, each of the communication flows is assumed to be set by the control device 1 as in FIG. 1.

Figure 4:
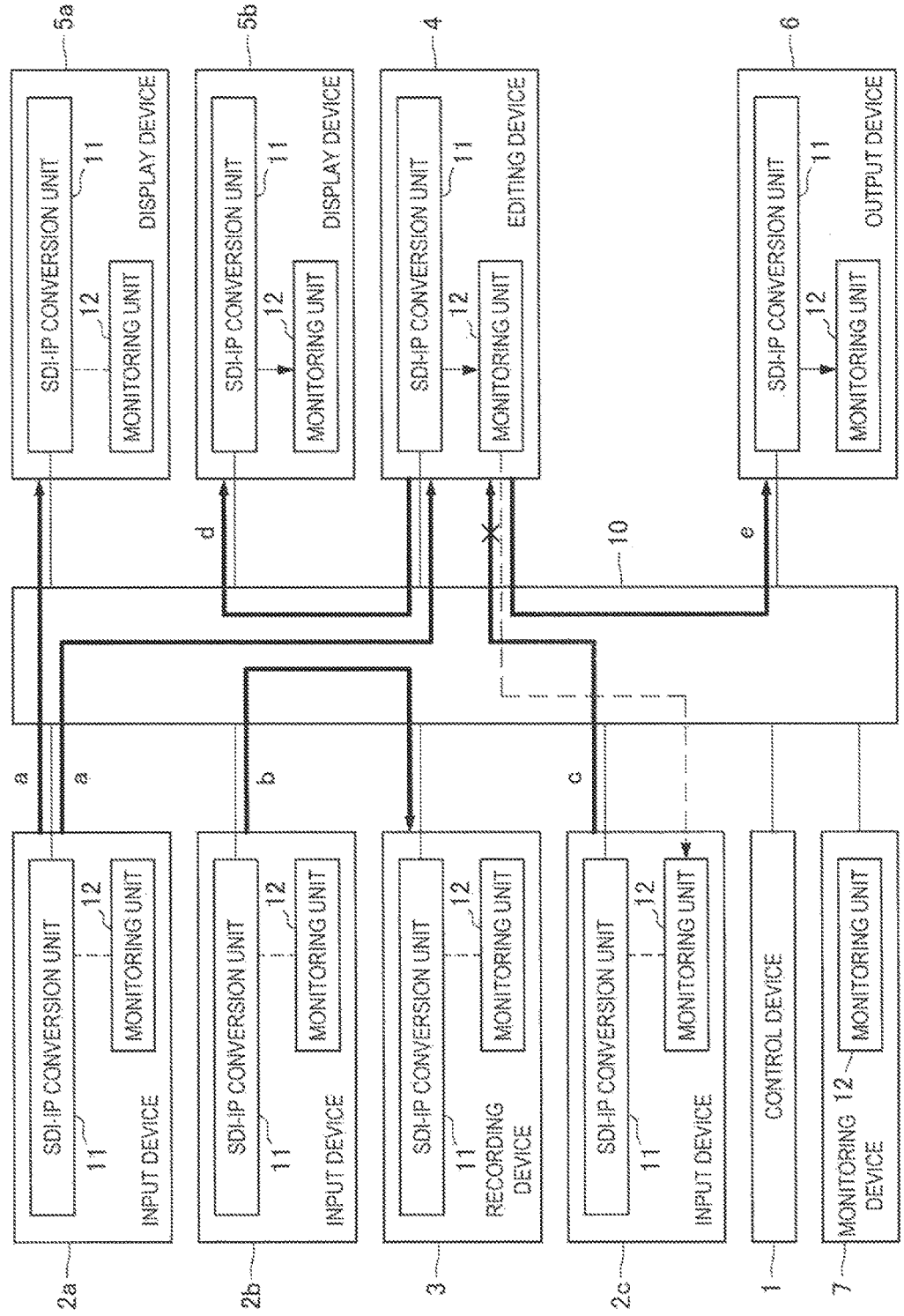
FIG. 4 is an illustrative diagram for describing an operation performed when a packet error is detected in the video editing system.

An operation performed in the video editing system configured as in FIG. 3 when the monitoring unit 12 of the editing device 4 has detected a packet error in the communication flow c as in FIG. 2 will be described. FIG. 4 is an illustrative diagram for describing the operation performed when a packet error has been detected in the video editing system according to the embodiment of the present disclosure shown in FIG. 3. Hereinbelow, the operation performed when the monitoring unit 12 of the editing device 4 detects a packet error in the communication flow c from the input device 2c to the editing device 4 will be described.

When the packet error has been detected in the communication flow c, the monitoring unit 12 of the editing device 4 remotely sets the monitoring unit 12 of the input device 2c to execute monitoring of the communication flow c as indicated by the dashed line of FIG. 4. When the monitoring unit 12 of the input device 2c is remotely set by the monitoring unit 12 of the editing device 4 to execute monitoring of the communication flow c, the monitoring unit 12 of the editing device 4 and the monitoring unit 12 of the input device 2c monitor the communication flow c at the same time thereafter.

In the example shown in FIG. 4, the monitoring unit 12 of the editing device 4 performs the remote setting directly in the monitoring unit 12 of the input device 2c, however, the monitoring unit 12 of the editing device 4 may directly perform the remote setting in the monitoring unit 12 of the input device 2c via the monitoring device 7.

Figure 5:
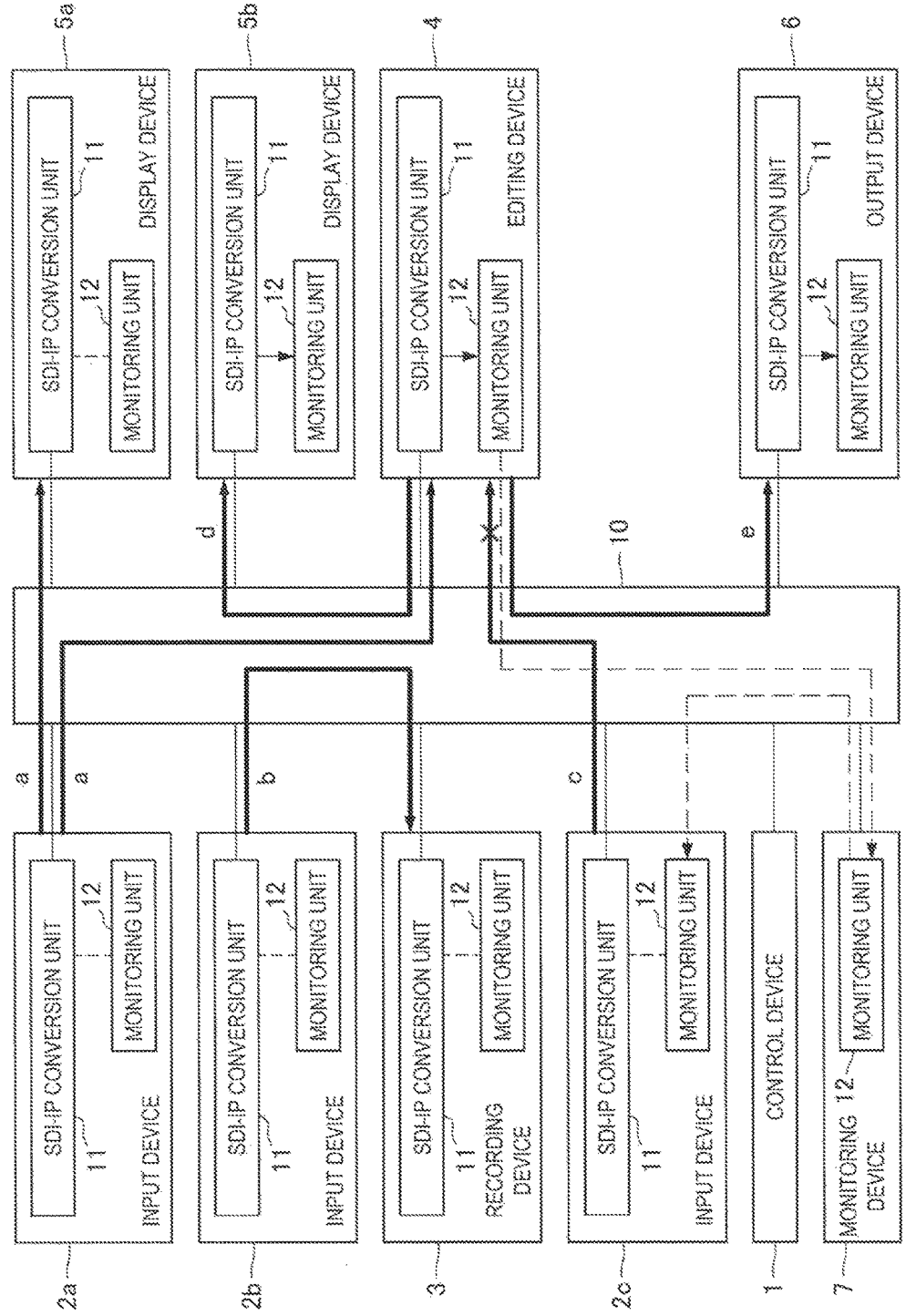
FIG. 5 is an illustrative diagram for describing an operation performed when a packet error is detected in the video editing system.

FIG. 5 is an illustrative diagram for describing an operation performed when a packet error has been detected in the video editing system according to the embodiment of the present disclosure shown in FIG. 3. Hereinbelow, the operation performed when the monitoring unit 12 of the editing device 4 has detected the packet error in the communication flow c from the input device 2c to the editing device 4 will be described.

When the packet error has been detected in the communication flow c, the monitoring unit 12 of the editing device 4 remotely sets the monitoring unit 12 of the monitoring device 7 to execute monitoring of the communication flow c as indicated by the dashed line of FIG. 5. Upon receiving the setting from the monitoring unit 12 of the editing device 4, the monitoring unit 12 of the monitoring device 7 remotely sets the monitoring unit 12 of the input device 2c to execute monitoring of the communication flow c as indicated by the dashed line of FIG. 5. As the monitoring unit 12 of the input device 2c is remotely set by the monitoring unit 12 of the monitoring device 7 to execute the monitoring of the communication flow c, the monitoring unit 12 of the editing device 4 and the monitoring unit 12 of the input device 2c monitor the communication flow c at the same time thereafter.

As described above, as the monitoring unit 12 of the editing device 4 and the monitoring unit 12 of the input device 2c monitor the communication flow c at the same time, it is possible to determine whether or not packets corresponding to the packet error detected by the monitoring unit 12 of the editing device 4 have actually been transmitted from the input device 2c. Monitoring the communication flow c by the monitoring unit 12 of the editing device 4 and the monitoring unit 12 of the input device 2c at the same time contributes to the work of specifying the cause of the occurrence of a fault. In addition, in the video editing system according to the embodiment of the present disclosure shown in FIG. 3, by transmitting packet data obtained by the monitoring unit 12 of the editing device 4 and the monitoring unit 12 of the input device 2c to the monitoring unit 12 of the monitoring device 7, monitoring results can be collectively processed in the monitoring device 7.

Third Configuration Example

Figure 6:
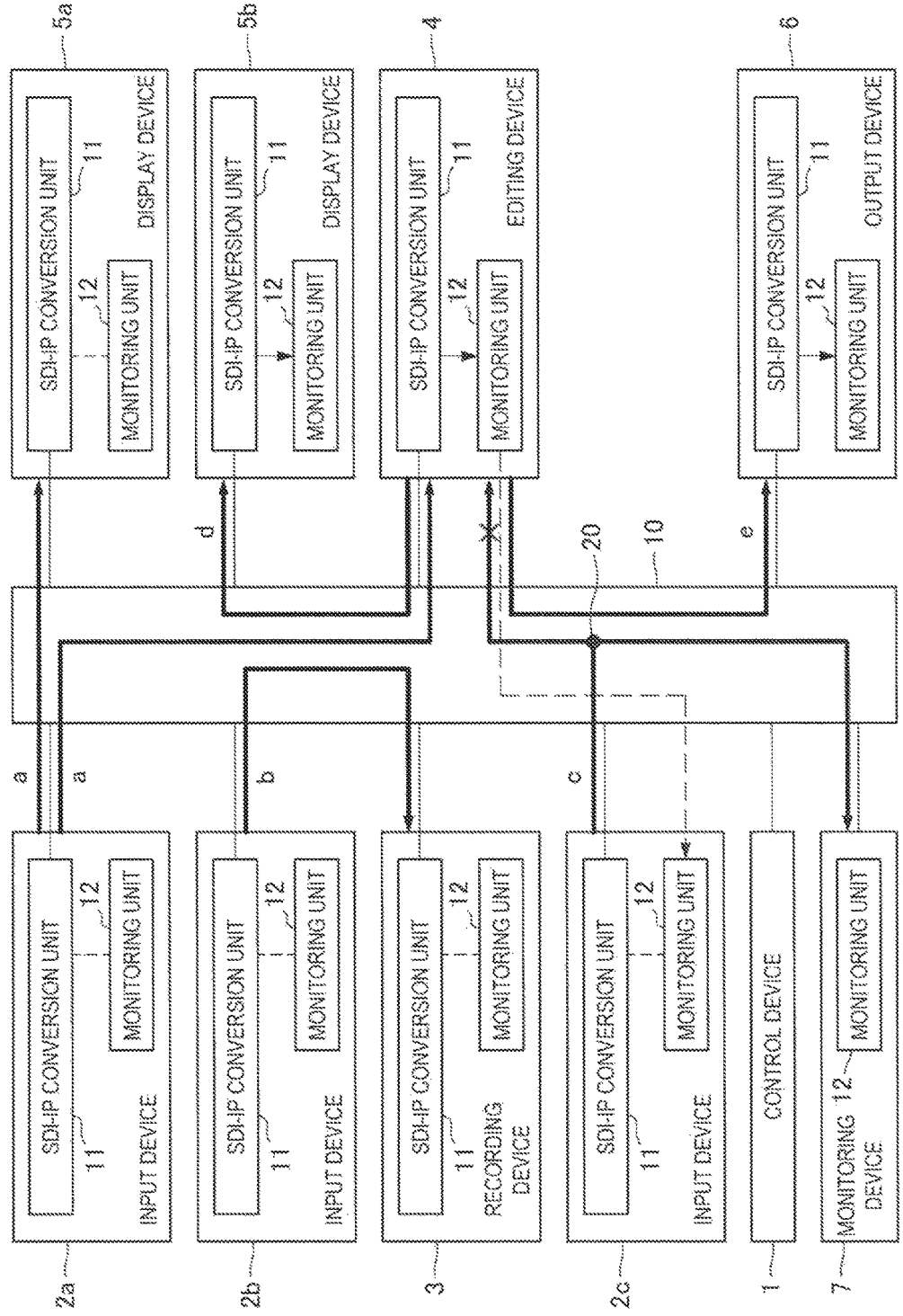
FIG. 6 is an illustrative diagram showing a configuration example of a video editing system according to an embodiment of the present disclosure.

Another example of the video editing system will be introduced. FIG. 6 is an illustrative diagram showing a configuration example of a video editing system according to an embodiment of the present disclosure. Hereinbelow, the configuration example of the video editing system according to the embodiment of the present disclosure will be described using FIG. 6.

The video editing system according to the embodiment of the present disclosure shown in FIG. 6 is configured to also set a communication flow on a relay point 20 provided on a network of the video editing system shown in FIG. 3 as a monitoring target. Note that the relay point provided on the network is equivalent to a monitoring point of a tap that is inserted in-line in connection between switches when, for example, the video editing system is constituted by a plurality of network switches, or a port of a switch for which mirroring is set.

The video editing system according to the embodiment of the present disclosure shown in FIG. 6 can monitor communication flows at reception points, transmission points, and relay points at the same time by also setting the communication flow at the relay point 20 on the network as a monitoring target of each monitoring unit 12. Thus, the video editing system according to the embodiment of the present disclosure shown in FIG. 6 can execute the work of specifying the cause of occurrence of a fault more effectively. In addition, in the video editing system according to the embodiment of the present disclosure shown in FIG. 6, monitoring results can be collectively processed by the monitoring device 7 by transmitting packet data obtained by the monitoring unit 12 of the editing device 4 and the monitoring unit 12 of the input device 2c to the monitoring device 7.

So far, the configuration examples of the video editing systems according to the embodiments of the present disclosure have been described. Next, functional configuration examples of devices which are included in a video editing system according to an embodiment of the present disclosure and have a monitoring function will be described.

1.2. Configuration Example of a Communication Device

Figure 7:
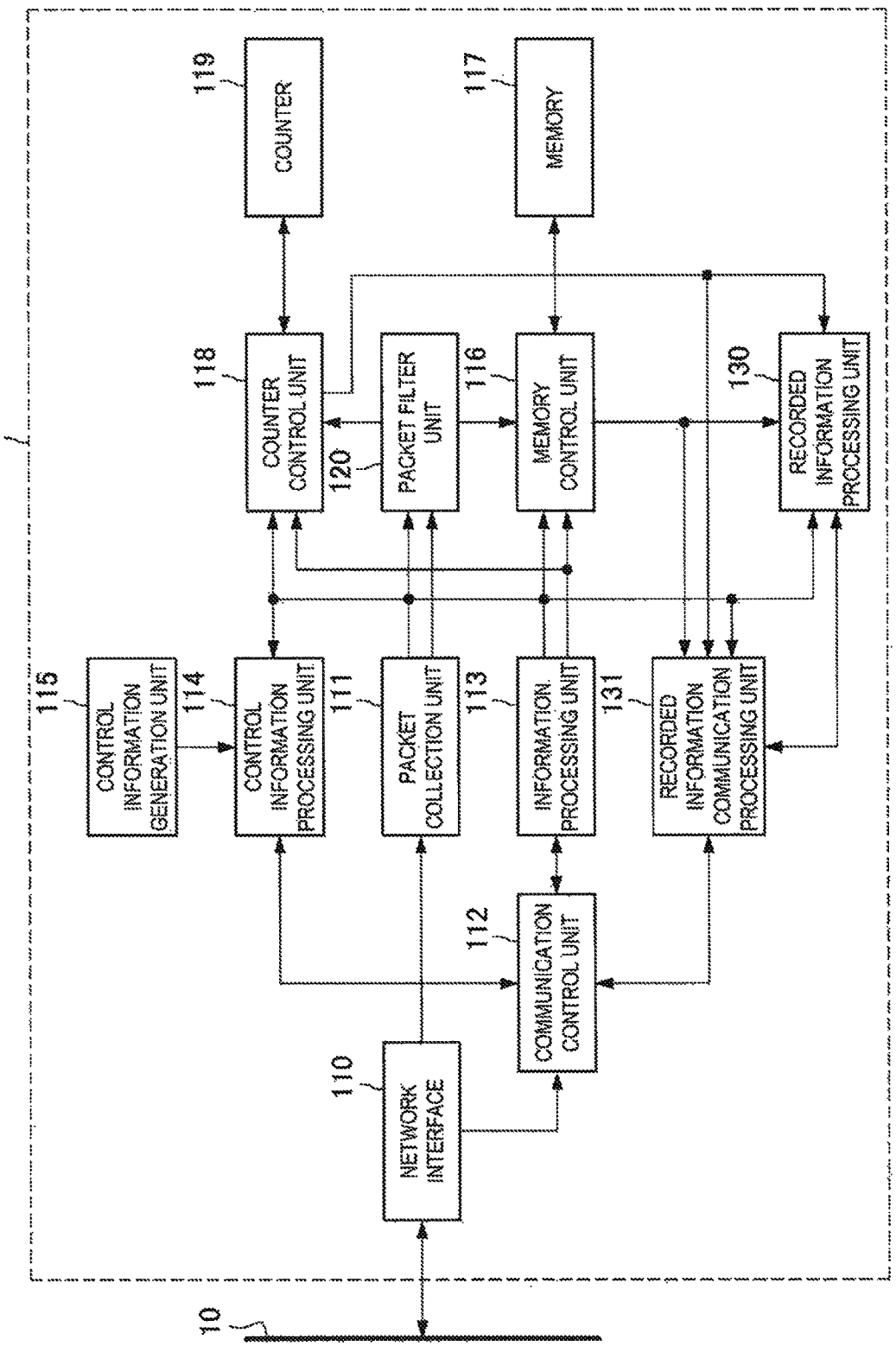
FIG. 7 is an illustrative diagram showing a functional configuration example of a communication device 100 according to an embodiment of the present disclosure.

FIG. 7 is an illustrative diagram showing a functional configuration example of a communication device 100 according to an embodiment of the present disclosure. The communication device 100 shown in FIG. 7 is a functional configuration example of each device with the monitoring function included in the video editing systems according to the embodiments of the present disclosure shown in FIGS. 1 to 6. Hereinbelow, the functional configuration example of the communication device 100 according to the embodiment of the present disclosure will be described using FIG. 7.

As shown in FIG. 7, the communication device 100 according to the embodiment of the present disclosure is configured to include a network interface 110, a packet collection unit 111, a communication control unit 112, an information processing unit 113, a control information processing unit 114, a control information generation unit 115, a memory control unit 116, a memory 117, a counter control unit 118, a counter 119, a packet filter unit 120, a recorded information processing unit 130, and a recorded information communication processing unit 131.

The network interface 110 is connected to a network constituted by the network switch group 10 and executes transmission and reception of data with other devices. In addition, the network interface 110 exchanges packets with the communication control unit 112 that has the network functions of layer 2 or higher. Further, the network interface 110 transfers transmission packets and reception packets that have passed through the network interface 110 to the packet collection unit 111 for the purpose of monitoring the network.

The packet collection unit 111 acquires the transmission packets and the reception packets that have passed the network interface 110 from the network interface 110. Then, the packet collection unit 111 transfers the packets acquired from the network interface 110 to the packet filter unit 120.

The communication control unit 112 exchanges packets with the network interface 110. In addition, the communication control unit 112 executes communication of information with the information processing unit 113, the control information processing unit 114, and the recorded information communication processing unit 131.

The information processing unit 113 executes processing of data for the communication service of the communication device 100, for example, processing of the video data and the audio data and processing of information relating to operation control of the communication device 100. In addition, the information processing unit 113 transfers log information and event information generated in the course of processing information to the memory control unit 116 and the counter control unit 118 in order to generate information relating to operation control of the memory 117.

The control information generation unit 115 generates information that is used in operations of the network monitoring function of the communication device 100 (control information) using, for example, hardware such as a keyboard, a mouse, and a display or software such as a user interface, none of which is illustrated.

The control information is broadly classified into, for example, information for setting a communication flow, information for setting a condition for a packet recording operation, information for setting content of packet recording information of packets, information for setting a monitoring operation, and the like.

The information for setting a communication flow can include, for example, network addresses of devices serving as a recipient and a transmission destination, information of a communication protocol, and the like.

The information for setting a condition for a packet recording operation can include, for example, a memory size, a condition for overwriting permission or prohibition, a condition for starting recording, a condition for stopping recording, information of packets to be recorded, information of packets to be counted, information of a cycle of recording, and the like.

The information for setting content of packet recording information can include, for example, information of a recording site in a packet (which is also referred to hereinafter as packet data notation) and the like.

The information for setting a monitoring operation can include, for example, settings of naming and retaining or discarding data, analyzing data in its own device or transferring data to another device, using only recorded information of its own device or also using recorded information of another device, allowing or not allowing remote control, allowing or not allowing SNMP TRAP transfer, and the like.

The control information described above is merely an example, and it is needless to say that the control information is not limited to the information and settings.

Based on the control information generated by the control information generation unit 115, the control information processing unit 114 computes information necessary in each processing block and then transfers the information to each processing block. Processing blocks with which the control information processing unit 114 exchanges the control information include the memory control unit 116 which controls a writing operation and a reading operation with respect to the memory 117, the counter control unit 118 which controls the counter 119 which counts the number of transmissions and receptions of designated given packets, the packet filter unit 120 which specifies packet data recorded in the memory 117 from collected transmitted and received packets, specifies packets to be counted, and generates data for memory control for controlling the memory 117, the recorded information processing unit 130 which collects packet data and count values that are recorded information and organizes the recorded information, and the recorded information communication processing unit 131 which communicates the packet data and the count values that are recorded information to another device.

When one piece of the control information includes information of a memory size, for example, the control information processing unit 114 performs processing of computing the value of a memory address that will be actually used based on the information of the memory size and writing the value in a register that retains memory address values of the memory control unit 116.

In addition, the control information processing unit 114 has a function of confirming the control information generated by the control information generation unit 115 and a function of transferring the control information to another device via the communication control unit 112.

The memory control unit 116 controls the writing operation and the reading operation of the memory 117 based on information transmitted from the control information processing unit 114. The memory control unit 116 sets a size and an address of the memory 117 on which packets are recorded based on the information transmitted from the control information processing unit 114 and records the packets on the memory 117, or reads the packets recorded on the memory 117. When, for example, a packet error has been detected, the memory control unit 116 reads packets from the memory 117 and transmits them to the recorded information processing unit 130.

The counter control unit 118 controls the counter 119 which counts the number of transmissions and receptions of predetermined given packets based on the information transmitted from the control information processing unit 114. When, for example, a packet error has been detected, the counter control unit 118 reads the count value counted by the counter 119 and transmits the value to the recorded information processing unit 130.

The packet filter unit 120 specifies packet data recorded on the memory 117 from transmitted and received packets collected by the packet collection unit 111, specifies packets to be counted, and generates memory control data for controlling the memory 117 based on the information transmitted from the control information processing unit 114. A configuration example of the packet filter unit 120 will be described later in detail.

The recorded information processing unit 130 collects the packet data and the count values which are recorded information from the memory control unit 116 and the counter control unit 118 and organizes the recorded information based on the information transmitted from the control information processing unit 114. For example, the recorded information processing unit 130 puts the recorded information collected by the memory control unit 116 and the counter control unit 118 in order of generation.

The recorded information communication processing unit 131 has functions of communicating the packet data and the count values that are the recorded information organized by the recorded information processing unit 130 to another device and outputting the recorded information organized by the recorded information processing unit 130 using hardware such as a keyboard, a mouse, and a display or software such as a user interface, none of which is illustrated.

In the configuration of the communication device 100 shown in FIG. 7, the information processing unit 113 corresponds to the SDI-IP conversion unit 11 of each device shown in FIGS. 1 to 6. Thus, the information processing unit 113 has the function of converting SDI signals into IP signals and vice versa. In addition, in the configuration of the communication device 100 shown in FIG. 7, the configuration other than the information processing unit 113 corresponds to the monitoring unit 12 of each device shown in FIGS. 1 to 6.

Because the communication device 100 according to the embodiment of the present disclosure has the configuration shown in FIG. 7, it is possible to realize a more effective network monitoring function in cooperation with another device.

So far, the functional configuration example of the communication device 100 according to the embodiment of the present disclosure has been described using FIG. 7. Next, a functional configuration example of the packet filter unit 120 included in the communication device 100 according to the embodiment of the present disclosure will be described.

Figure 8:
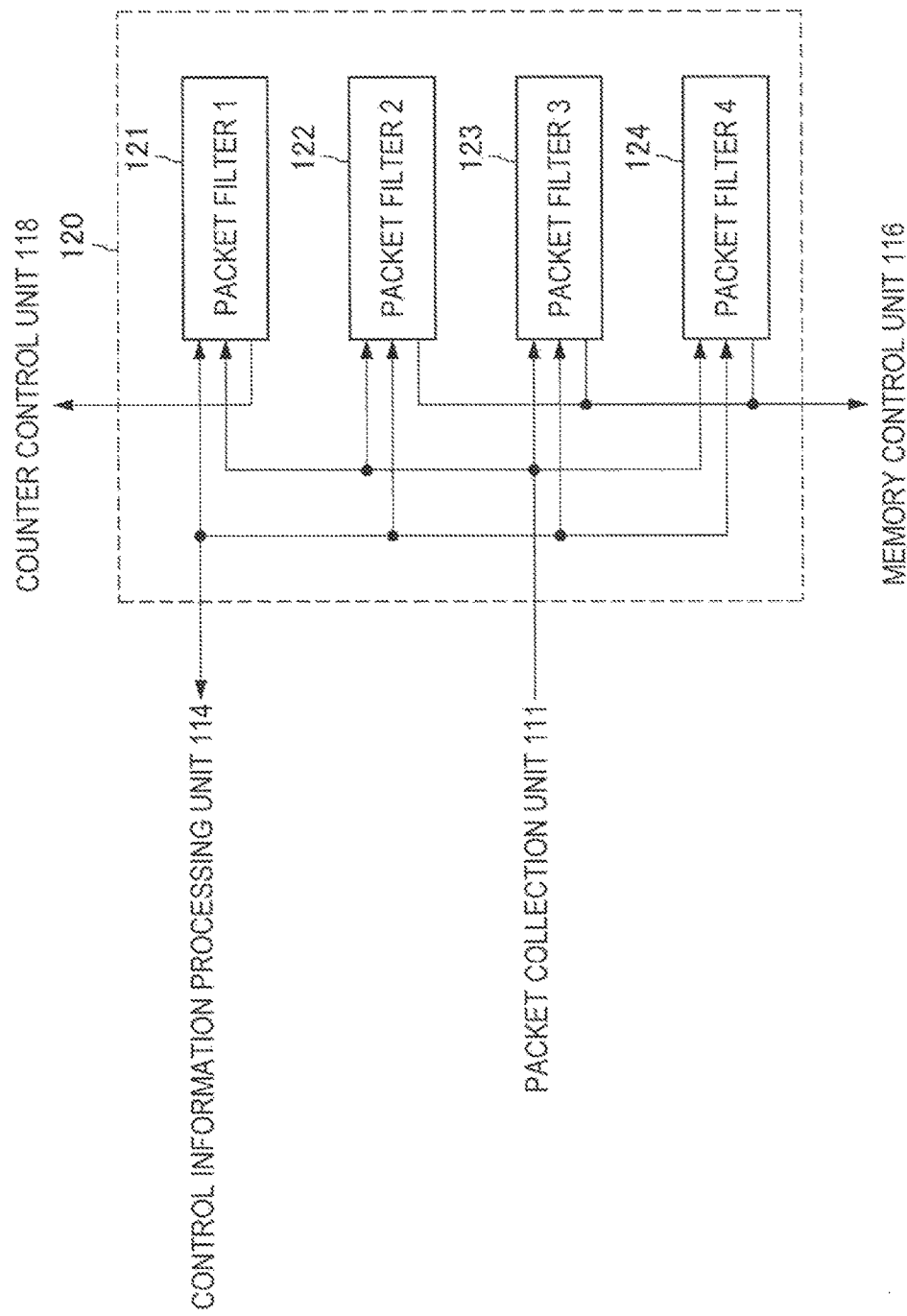
FIG. 8 is an illustrative diagram showing a functional configuration example of a packet filter unit 120.

FIG. 8 is an illustrative diagram showing the functional configuration example of the packet filter unit 120 included in the communication device 100 according to the embodiment of the present disclosure. Hereinbelow, the functional configuration example of the packet filter unit 120 included in the communication device 100 according to the embodiment of the present disclosure will be described using FIG. 8.

As shown in FIG. 8, the packet filter unit 120 is configured to include packet filters 121, 122, 123, and 124. The packet filter 121 is a filter for selecting packets to be counted by the counter 119. When packets that have or do not have designated given patterns are to be counted, the control information processing unit 114 sets the patterns or matching or non-matching of the packets with the patterns in the packet filter 121.

The packet filters 122, 123, and 124 are filters for selecting packets relating to recording of the memory 117. For example, the packet filter 122 is set to be a filter for selecting packets to be recorded on the memory 117, the packet filter 123 to be a filter for selecting a trigger packet serving as a trigger to start recording on the memory 117, and the packet filter 124 to be a filter for selecting a trigger packet serving as a trigger to stop recording on the memory 117. When packets that have or do not have the designated given patterns are to be selected, the control information processing unit 114 also sets the pattern and matching or non-matching of the packets with the pattern in the packet filters 122, 123, and 124 as in the case of the packet filter 121.

Although FIG. 8 shows the configuration in which the four packet filters 121, 122, 123, and 124 are included in the packet filter unit 120, the present disclosure is not limited to this example. The packet filter unit 120 may be configured in multiple stages or with packet filters of which the number differs according to the type of packets to be recorded on the memory 117 or the number of the counters 119.

For example, the packet filter unit 120 may have a configuration of packet filters in which a plurality of conditions for matching or non-matching with the designated give patterns are effectively set at the same time. In addition, when, for example, the packet filter 121 that selects packets to be counted by the counter 119 is configured to include a plurality of independent packet filters, the counter 119 can count transmission packets and reception packets of a plurality of different communication flows at the same time, and therefore the effect of observing throughput of each communication flow more successfully is exhibited.

So far, the functional configuration example of the packet filter unit 120 included in the communication device 100 according to the embodiment of the present disclosure has been described using FIG. 8. Next, a system operation example at the time of executing the network monitoring function using the communication device 100 according to the embodiment of the present disclosure will be described.

Figure 9:
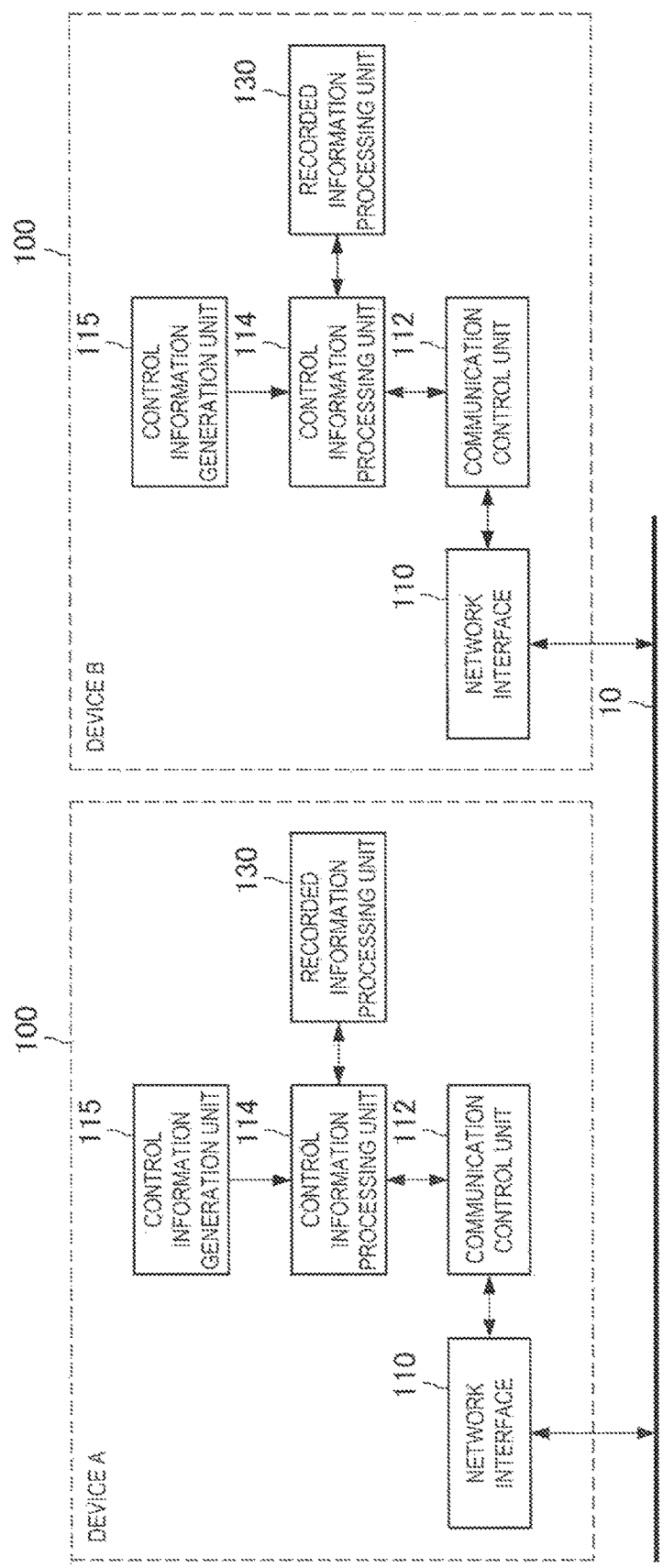
FIG. 9 is an illustrative diagram for describing a system operation example.

1.3. System Operation Example at the Time of Executing a Network Monitoring Function FIG. 9 is an illustrative diagram for describing a system operation example at the time of executing the network monitoring function using the communication device 100 according to the embodiment of the present disclosure. FIG. 9 shows a configuration of a system when the network monitoring function is executed using two communication devices 100. Description will be provided by setting the two respective communication devices 100 as a device A and a device B in FIG. 9. Hereinbelow, the operation example in which the devices A and B collect recorded information under the same condition by transmitting control information generated by the device A to the device B will be described.

Note that only functional blocks to be used in the description are shown in each of the devices A and B in FIG. 9.

The communication device 100 operated as the device A confirms control information generated by the control information generation unit 115 in the control information processing unit 114. The control information processing unit 114 transfers the confirmed control information to each block that needs the control information in its own device and also transfers the confirmed control information to the communication device 100 operated as the device B via the communication control unit 112 and the network interface 110.

Upon receiving the control information from the communication device 100 operated as the device A in the network interface 110, the communication device 100 operated as the device B receives the control information in the control information processing unit 114 via the communication control unit 112 and confirms control information in the control information processing unit 114. The control information processing unit 114 of the communication device 100 operated as the device B transfers the confirmed control information to each block that needs the control information in its own device.

In the case of partially changing the control information generated in the device A, the control information may be changed in the communication device 100 operated as the device A to be transmitted to the communication device 100 operated as the device B, or a part to be changed may be created in the communication device 100 operated as the device B. The case of partially changing the control information is, for example, the case of changing only a network address that is a monitoring target and not changing other pieces of information.

In the case where the device A and the device B communicate video data by using UDP and RTP as communication protocols, such as the case where the device A and the device B monitor packets of the same video data by using the device B as a transmission side device and the device A as a reception side device, a large part of control information that needs to be set in both the devices is common. The control information includes many different pieces of information as described above. The communication device 100 according to the embodiment of the present disclosure can set the control information including those many different pieces of information in another communication device with a simple procedure.

Figure 10:
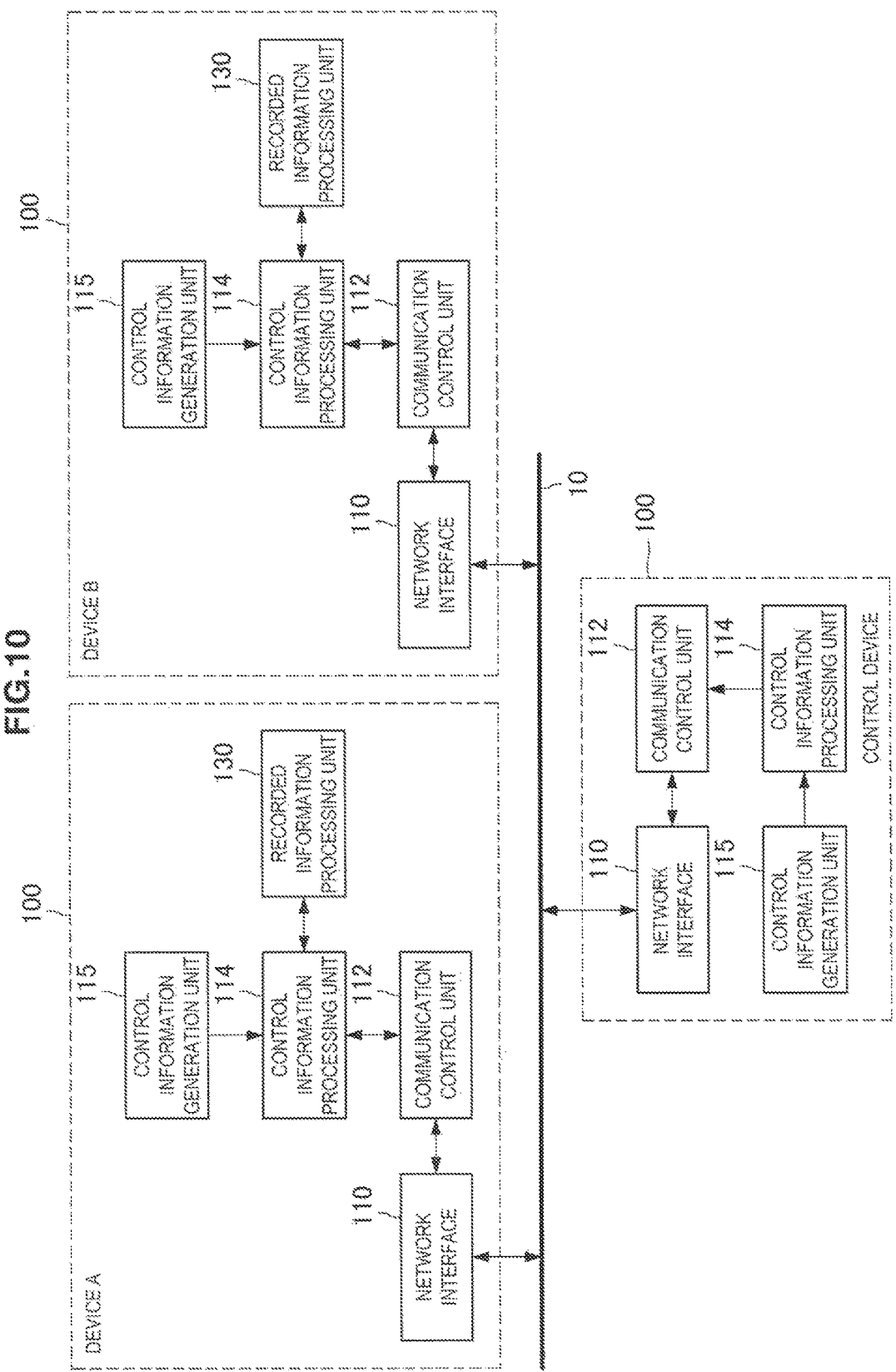
FIG. 10 is an illustrative diagram for describing a system operation example.

FIG. 10 is an illustrative diagram for describing a system operation example at the time of executing the network monitoring function using the communication device 100 according to the embodiment of the present disclosure. FIG. 10 shows a configuration of a system when the network monitoring function is executed using three communication devices 100. Description will be provided by setting the respective communication devices 100 that transmit and receive data as a device A and a device B and setting the communication device 100 that generates control information as a control device in FIG. 10. Hereinbelow, the operation example in which the devices A and B collect recorded information under the same condition by transmitting control information generated by the control device to the devices A and B will be described.

Note that only functional blocks to be used in the description are shown in the device A, the device B, and the control device in FIG. 10.

The communication device 100 operated as the control device confirms control information generated by the control information generation unit 115 in the control information processing unit 114. The control information processing unit 114 transfers the confirmed control information to the communication device 100 operated as the device A and the communication device 100 operated as the device B via the communication control unit 112 and the network interface 110.

Figure 11:
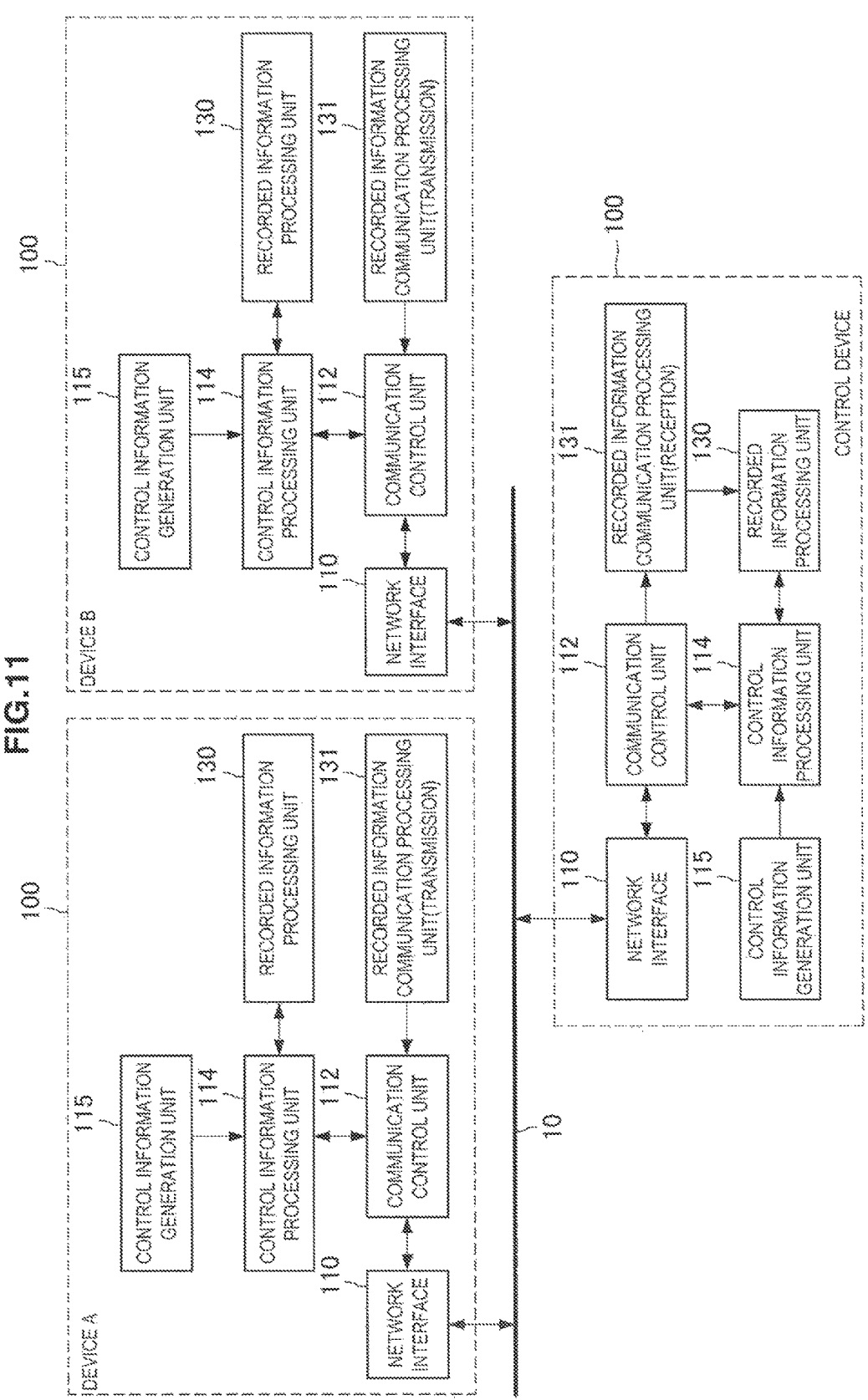
FIG. 11 is an illustrative diagram for describing a system operation example.

In the case of partially changing the control information generated in the control device, the control information may be changed in the communication device 100 operated as the control device to be transmitted to the communication devices 100 operated as the devices A and B, or a part to be changed may be created in the communication devices 100 operated as the devices A and B. The case of partially changing the control information is, for example, the case of changing only a network address that is a monitoring target and not changing other pieces of information FIG. 11 is an illustrative diagram for describing a system operation example at the time of executing the network monitoring function using the communication device 100 according to the embodiment of the present disclosure. FIG. 11 shows a configuration of a system when the network monitoring function is executed using three communication devices 100. Description will be provided by setting the respective communication devices 100 that transmit and receive data as a device A and a device B and setting the communication device 100 that generates control information as a control device in FIG. 11. Hereinbelow, the operation example in which the devices A and B collect recorded information under the same condition by transmitting control information generated by the control device to the devices A and B and transmit the collected recorded information to the control information will be described.

Note that only functional blocks to be used in the description are shown in the device A, the device B, and the control device in FIG. 11.

The communication device 100 operated as the control device confirms control information generated by the control information generation unit 115 in the control information processing unit 114. The control information processing unit 114 transfers the confirmed control information to the communication device 100 operated as the device A and the communication device 100 operated as the device B via the communication control unit 112 and the network interface 110. The communication device 100 operated as the control device incorporates information of an instruction to transmit the collected recorded information to the control device into the control information to be transmitted to the devices A and B.

Then, the communication device 100 operated as the device A and the communication device 100 operated as the device B transmit the recorded information collected on the basis of the control information to the communication device 100 operated as the control device via the recorded information communication processing units 131, the communication control units 112, and the network interfaces 110. The communication device 100 operated as the control device receives the recorded information transmitted from the communication device 100 operated as the device A and the communication device 100 operated as the device B in the recorded information communication processing unit 131 via the network interface 110 and the communication control unit 112 and organizes the recorded information in the recorded information processing unit 130.

Figure 12:
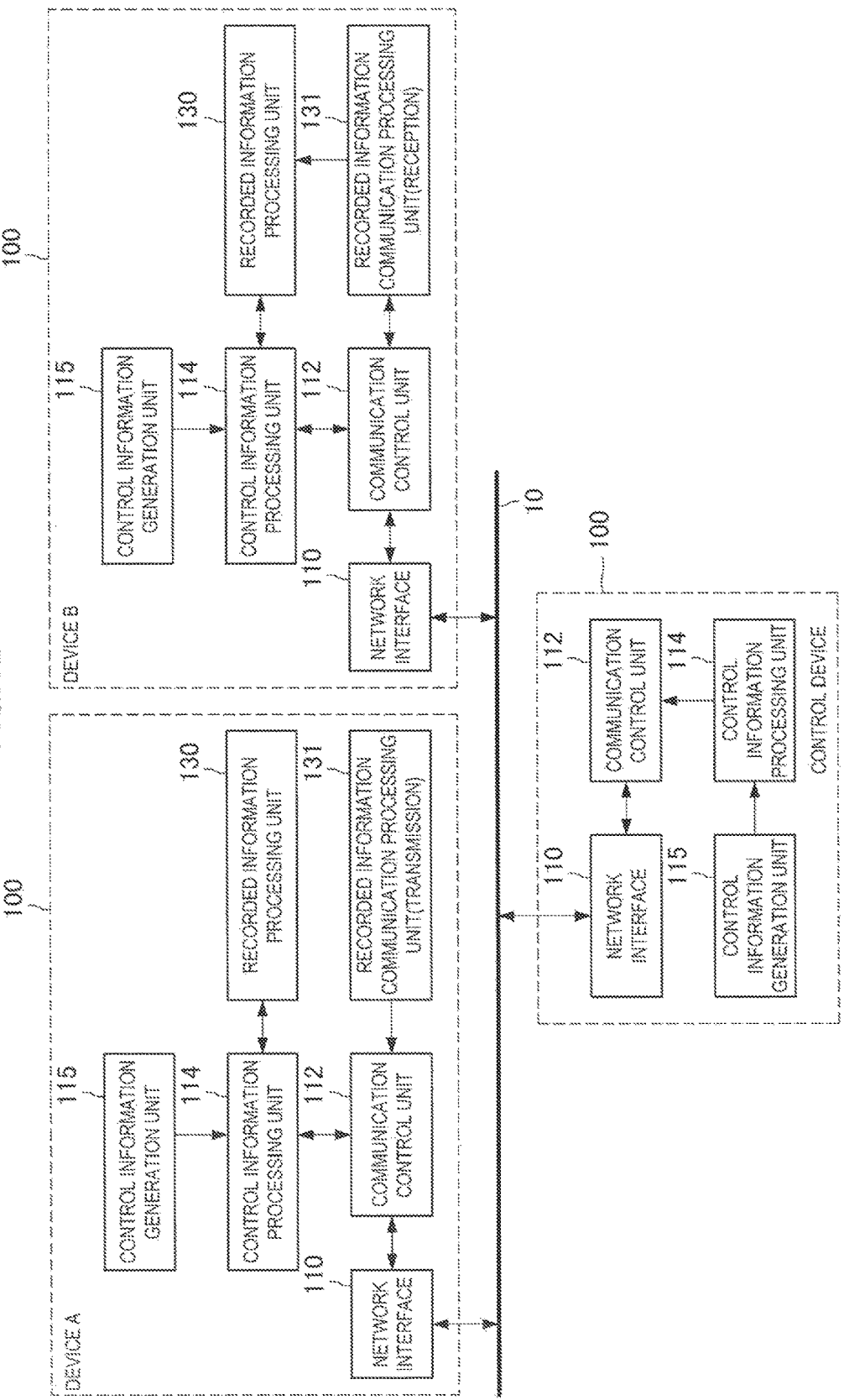
FIG. 12 is an illustrative diagram for describing a system operation example.

FIG. 12 is an illustrative diagram for describing a system operation example at the time of executing the network monitoring function using the communication device 100 according to the embodiment of the present disclosure. FIG. 12 shows a configuration of a system when the network monitoring function is executed using three communication devices 100. Description will be provided by setting the respective communication devices 100 that transmit and receive data as a device A and a device B and setting the communication device 100 that generates control information as a control device in FIG. 12. Hereinbelow, the operation example in which control information generated by the control device is transmitted to the devices A and B and recorded information collected by the device A is processed in the device B will be described.

Note that only functional blocks to be used in the description are shown in the device A, the device B, and the control device in FIG. 12.

The communication device 100 operated as the control device confirms control information generated by the control information generation unit 115 in the control information processing unit 114. The control information processing unit 114 transfers the confirmed control information to the communication device 100 operated as the device A and the communication device 100 operated as the device B via the communication control unit 112 and the network interface 110. The communication device 100 operated as the control device incorporates information of an instruction to transmit the collected recorded information to the device B into the control information to be transmitted to the device A. Further, the communication device 100 operated as the control device incorporates information of an instruction to receive the recorded information collected by the device A in the device B into the control information to be transmitted to the device B.

Then, the communication device 100 operated as the device A transmits the recorded information collected on the basis of the control information to the communication device 100 operated as the device B via the recorded information communication processing unit 131, the communication control unit 112, and the network interface 110. The communication device 100 operated as the device B receives the recorded information transmitted from the communication device 100 operated as the device A in the recorded information communication processing unit 131 via the network interface 110 and the communication control unit 112 and organizes the recorded information in the recorded information processing unit 130.

Because the communication device 100 according to the embodiment of the present disclosure is used as described above, control information generated in its own device is shared by another device and the network can be monitored under the same condition. Further, because the communication device 100 according to the embodiment of the present disclosure is used as described above, control information generated in its own device is transmitted to another device and recorded information collected on the basis of the control information can be received in a device serving as a transmission destination or can be further transferred to another device.

So far, a system operation example at the time of executing the network monitoring function using the communication device 100 according to the embodiment of the present disclosure has been described. Next, an operation example of the communication device 100 according to the embodiment of the present disclosure will be described.

1.4. Operation Example of a Communication Device

Figure 13:
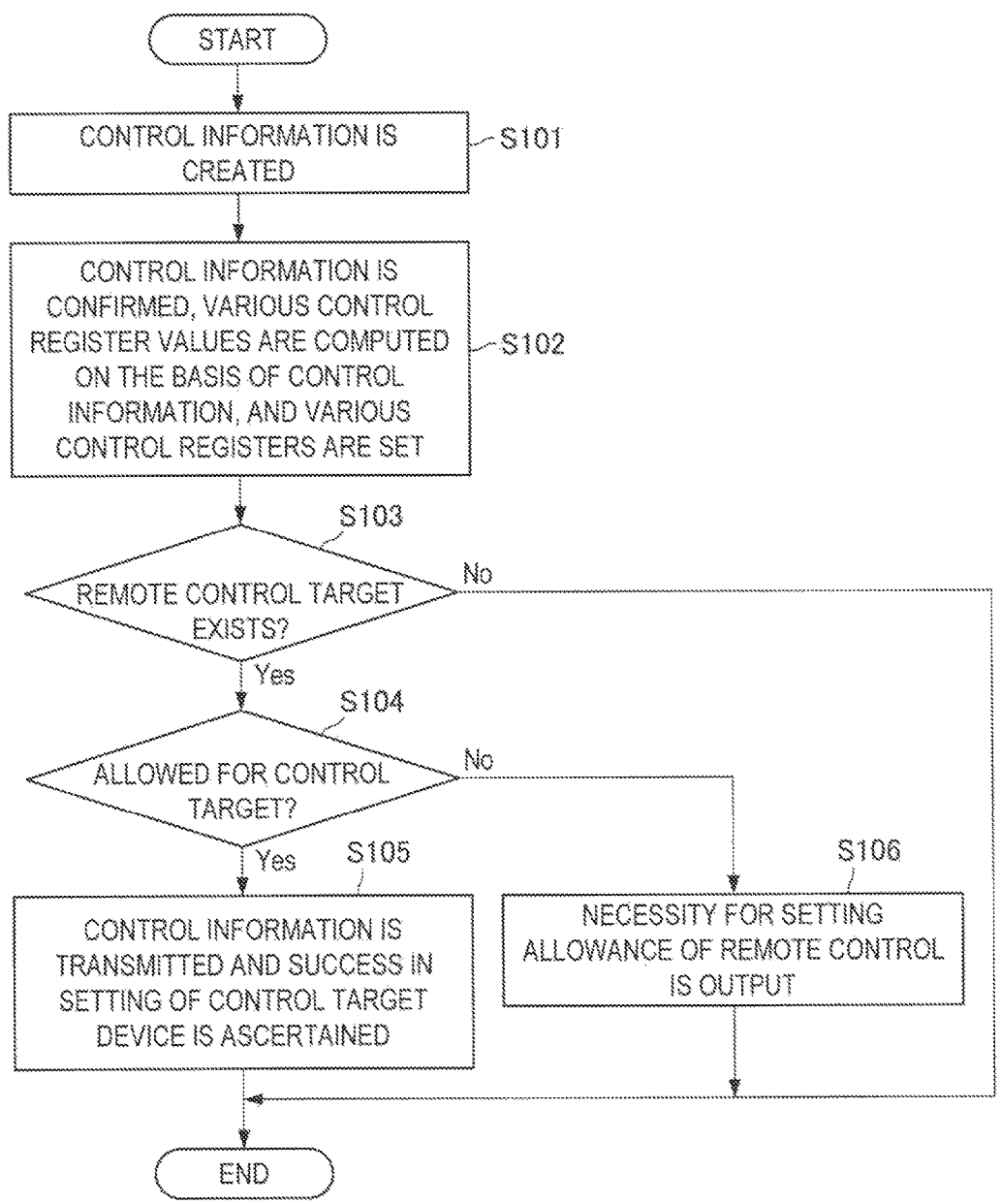
FIG. 13 is a flowchart showing an operation example of a communication device 100 according to an embodiment of the present disclosure.

FIG. 13 is a flowchart showing an operation example of the communication device 100 according to the embodiment of the present disclosure. FIG. 13 shows the operation example of the communication device 100 in which the communication device 100 generates control information and transmits the generated control information to another device. Hereinbelow, the operation example of the communication device 100 according to the embodiment of the present disclosure will be described using FIG. 13.

The communication device 100 causes the control information generation unit 115 to create control information (Step S101). In creating the control information, the control information generation unit 115 generates information necessary for an operation of the network monitoring function of the communication device 100 using hardware such as a keyboard, a mouse, and a display or software such as a user interface as described above.

When the control information generation unit 115 has created the control information in Step S101, the communication device 100 then confirms the created control information using the control information processing unit 114, computes various control register values to be set for each functional block inside the communication device 100 based on the confirmed control information using the control information processing unit 114, and sets the various control registers for each functional block using the control information processing unit 114 (Step S102).

As described above, processing blocks with which the control information processing unit 114 exchanges the control information are the memory control unit 116, the counter control unit 118, the packet filter unit 120, the recorded information processing unit 130, and the recorded information communication processing unit 131.

Next, the communication device 100 determines whether or not there is a device to be remotely controlled by transmitting the control information using, for example, the control information processing unit 114 (Step S103). When there is no device to be remotely controlled, the communication device 100 finishes the process as is. On the other hand, when there is a device to be remotely controlled, the communication device 100 then executes communication with the target device and determines whether or not the target device is set to allow remote control using, for example, the control information processing unit 114 (Step S104).

When it is determined as a result of Step S104 described above that the target device is set to allow remote control, the communication device 100 transmits the control information to the target device through the control information processing unit 114, the communication control unit 112, and the network interface 110. Then, the communication device 100 ascertains that a setting of the control information in the remote control target device has succeeded based on a response from the target device (Step S105).

On the other hand, when it is determined as a result of step S104 that the target device is not set to allow remote control, the communication device 100 outputs information that it is necessary to set the target device to allow remote control for execution of the remote control of the target device to, for example, a display device that is not illustrated (Step S106). By outputting the information that it is necessary to set the target device to allow remote control, the communication device 100 can notify a user of the necessity of changing the setting of the target device.

Note that the setting of allowing remote control is executed, for example, while each device executes the process of creating the control information in Step S101 described above.

So far, the operation example of the communication device 100 in which the control information is generated by the communication device 100 and the generated control information is transmitted to another device has been described.

Figure 14:
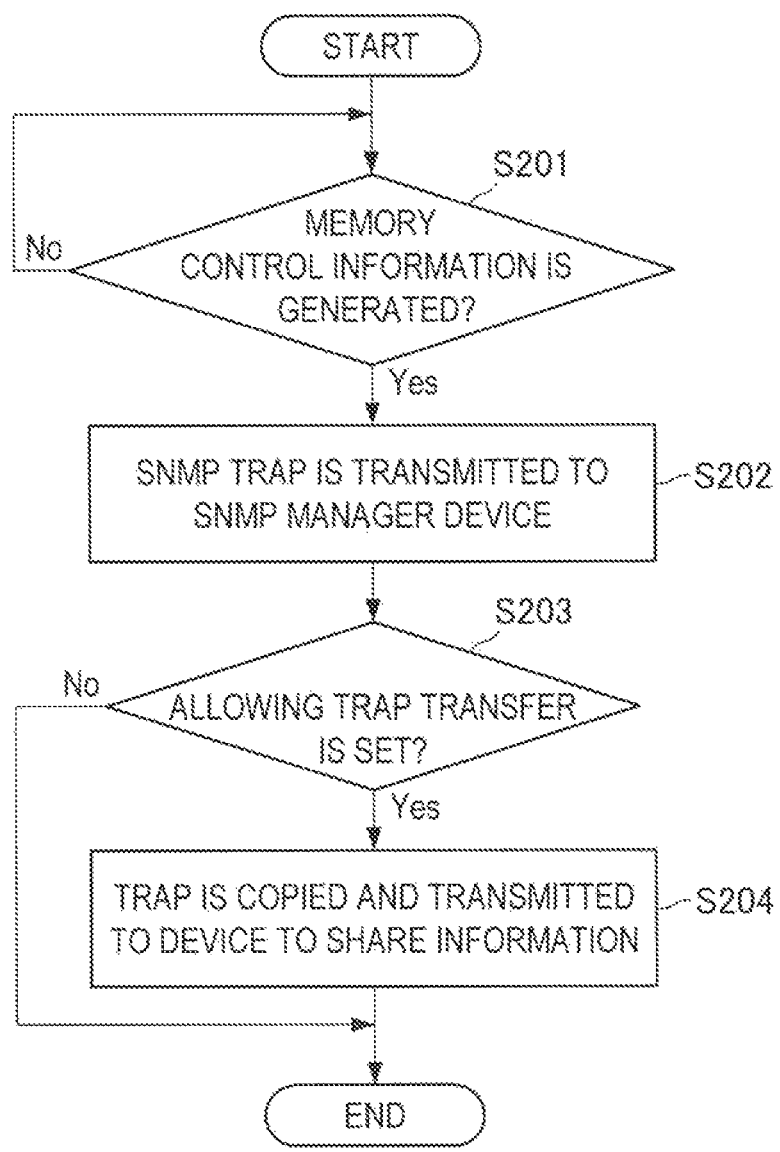
FIG. 14 is a flowchart showing an operation example of a communication device 100 according to an embodiment of the present disclosure.

FIG. 14 is a flowchart showing an operation example of the communication device 100 according to an embodiment of the present disclosure. FIG. 14 shows an operation example of the communication device 100 when generation of information of control of a start operation and a stop operation of writing to the memory 117, the information being used in the memory control unit 116, is shared by a plurality of devices. Hereinbelow, an operation example of the communication device 100 according to the embodiment of the present disclosure will be described using FIG. 14.

In the case where a simple network management protocol (SNMP) manager device exists in a network system, the communication device transmits SNMP TRAP to the SNMP manager device when an abnormal phenomenon occurs in the course of processing information. The flowchart in FIG. 14 shows an operation example in which information is shared by a plurality of devices by diverting this transmission function of SNMP TRAP.

When the memory control unit 116 detects generation of information of control of a start operation and a stop operation of writing to the memory 117, the communication device 100 transmits SNMP TRAP in which content of the information can be recognized to a device having a SNMP manager function (Step S202).

SNMP TRAP is a unicast communication packet transmitted to the device having the SNMP manager function, and therefore the two communication devices 100 do not communicate with each other except that any one of the two communication devices 100 has the SNMP manager function. In view of this, the device that has received the SNMP TRAP determines whether to perform an SNMP TRAP transfer operation by ascertaining a setting item of allowing or not allowing SNMP TRAP transfer included in control information (Step S203).

In the case where allowing SNMP TRAP transfer is set, the device that has received the SNMP TRAP copies the SNMP TRAP to transfer the SNMP TRAP to an address of the communication device 100 to share the information (Step S204). In the case where allowing SNMP TRAP transfer is not set, the processing of Step S204 is skipped.

In the above example, an example where SNMP TRAP information transmitted to the device having the SNMP manager function is copied has been described. However, the SNMP TRAP transmitted to the address of the communication device 100 to share the information may be content that directly instructs a start operation and a stop operation of writing to the memory 117.

In the case where the information of control of the start operation and the stop operation of writing to the memory 117 is caused by the processing of the information processing unit 113, SNMP TRAP may be defined with respect to not only an abnormal phenomenon but a normal phenomenon. Because the SNMP TRAP is defined with respect to not only the abnormal phenomenon but also the normal phenomenon, both the abnormal phenomenon and the normal phenomenon can be used for controlling the start operation and the stop operation of writing to the memory 117.

Further, the information of control of the start operation and the stop operation of writing to the memory 117 may be generated under a condition in which a plurality of predetermined abnormal phenomena and predetermined normal phenomena occur in time series.

In the case where the information of control of the start operation and the stop operation of writing to the memory 117 is caused by the processing of the packet filter unit 120, SNMP TRAP may also be defined with respect to this case. Even in the case where the information is caused by the processing of the packet filter unit 120, the information can be used for controlling the start operation and the stop operation of writing to the memory 117.

Note that, in a network system in which a plurality of communication devices 100 to share the information of control of the start operation and the stop operation of writing to the memory 117 may exist, SNMP TRAP can be transmitted by specifying the communication device 100 that is a cause of the information.

For example, in an example of a network system in which the device A processes communication data from the device B and the device C at the same time, the device A determines to which device a phenomenon detected in the course of processing information relates and transmits SNMP TRAP to the related device. When the phenomenon is detected in the packet filter unit 120 of the device A, it is possible to determine which device has transmitted packets on the basis of address information of the packets and transmit SNMP TRAP to the communication device 100 that has transmitted the packets.

So far, an operation example of the communication device 100 when generation of information of control of a start operation and a stop operation of writing to the memory 117 is shared by a plurality of devices has been described. Note that, in this embodiment, generation of information of control of a start operation and a stop operation of writing to the memory 117 is shared by a plurality of devices by using SNMP TRAP. However, the present disclosure is not limited to the above example. Another protocol can be used as long as the protocol can securely transfer, to a counterpart, generation of information of control of a start operation and a stop operation of writing to the memory 117.

Figure 15:
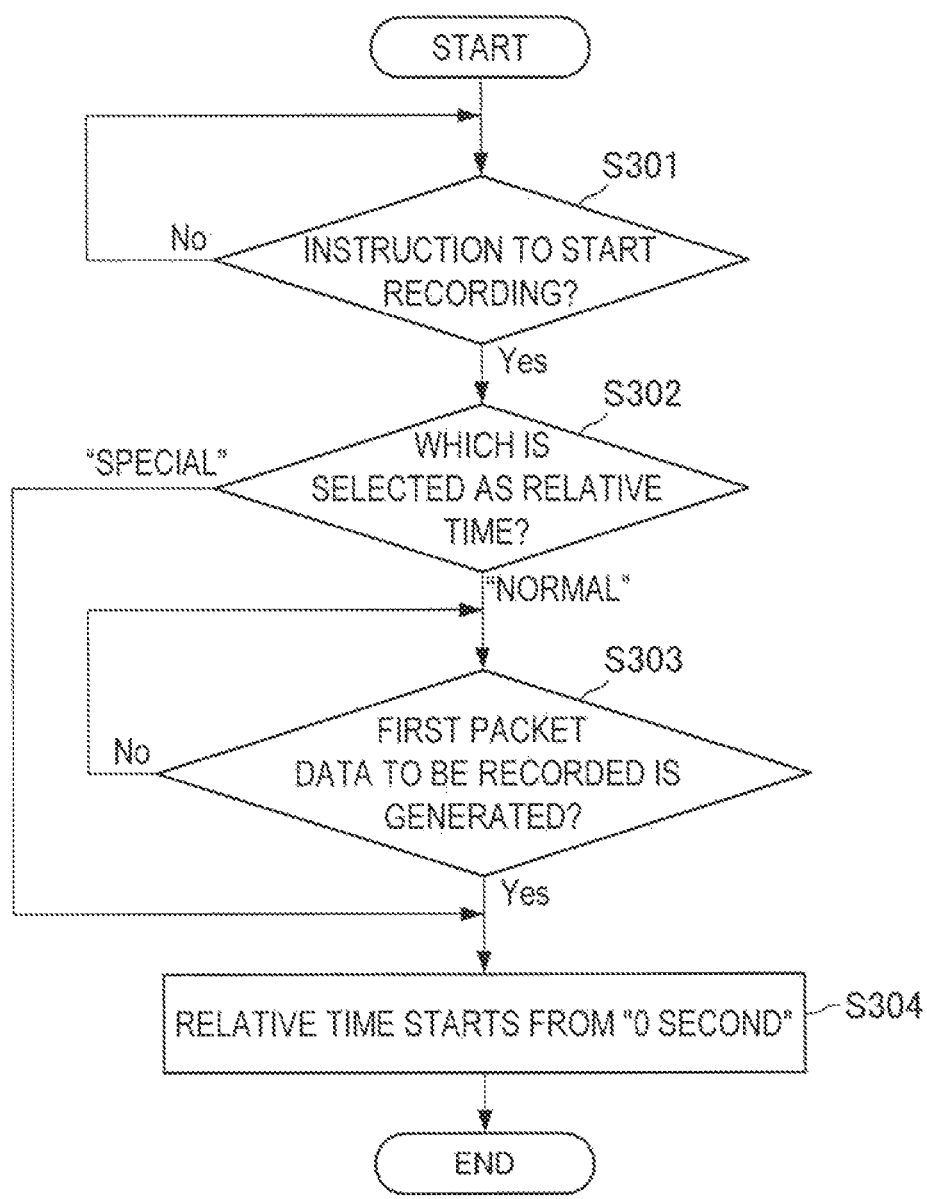
FIG. 15 is a flowchart showing an operation example of a communication device 100 according to an embodiment of the present disclosure.

FIG. 15 is a flowchart showing an operation example of the communication device 100 according to an embodiment of the present disclosure. FIG. 15 shows the operation example of the communication device 100 regarding a time stamp recorded together with packet data. Hereinbelow, the operation example of the communication device 100 according to the embodiment of the present disclosure will be described using FIG. 15.

Generally, in the case where a LAN analyzer device records packets, two kinds of time stamps, i.e., an absolute time and a relative time can be used as time information. Herein, a definition of the relative time is that a record time of a recorded first packet is "0 second".

A time required between a time at which a record start condition is satisfied and a generation time of the first packet is effective information to analyze an information processing operation of the communication device 100 in many cases. In the case where the packet is recorded by using not only the relative time but also the absolute time and the time at which the record start condition is satisfied is separately stored as a log record, the information can be obtained by referring to both the records of the relative time and the absolute time. However, in this case, time expressions used in the former and the latter need to have the same granularity. In order to use an event that does not accompany a time record as the record start condition, it is necessary to make a special design so that a generation time of this event is also recorded. In any case, labor and time for operation that compares both the records of the relative time and the absolute time are generated.

Because processing is performed by using the relative time at which the record start condition is satisfied as "0 second", this embodiment proposes a method of saving labor and time for operation that compares both the records of the relative time and the absolute time.

The communication device 100 according to the embodiment of the present disclosure waits until the communication device 100 receives an instruction to start recording generated at the time at which the record start condition is satisfied (S301). Upon receiving the instruction to start recording, the communication device 100 ascertains selected content of the relative time set as a part of control information (S302).

In the case where the selected content of the relative time set as a part of control information is "normal" as a result of determination in Step S302, the communication device 100 waits until a first packet to be recorded is generated (Step S303) and sets the relative time to "0 second" (Step S304).

Meanwhile, in the case where the selected content of the relative time set as a part of control information is "special" as a result of determination in Step S302, the communication device 100 immediately sets the relative time to "0 second" (Step S304).

The communication device 100 according to the embodiment of the present disclosure sets the selected content of the relative time as control information and executes the operation shown in FIG. 15, and therefore it is possible to save labor and time for referring to both the records of the relative time and the absolute time.

2. HARDWARE CONFIGURATION

Each of the algorithms described above can be performed by using, for example, the hardware configuration shown in FIG. 16. That is, the processing of each of the algorithms can be realized by controlling the hardware shown in FIG. 16 using a computer program. Note that the mode of this hardware is arbitrary, and may be, for example, a personal computer, a mobile information terminal such as a mobile phone, a PHS or a PDA, a game machine, a contact or non-contact IC chip, a contact or non-contact IC card, or various types of information appliances. Moreover, the PHS is an abbreviation for Personal Handy-phone System. Also, the PDA is an abbreviation for Personal Digital Assistant.

As shown in FIG. 16, this hardware mainly includes a CPU 902, a ROM 904, a RAM 906, a host bus 908, and a bridge 910. Furthermore, this hardware includes an external bus 912, an interface 914, an input unit 916, an output unit 918, a storage unit 920, a drive 922, a connection port 924, and a communication unit 926. Moreover, the CPU is an abbreviation for Central Processing Unit. Also, the ROM is an abbreviation for Read Only Memory. Furthermore, the RAM is an abbreviation for Random Access Memory.

The CPU 902 functions as an arithmetic processing unit or a control unit, and controls entire operation or a part of the operation of each structural element based on various programs recorded on the ROM 904, the RAM 906, the storage unit 920, or a removable recording medium 928. The ROM 904 is a device for storing a program to be read by the CPU 902 or data or the like used in an arithmetic operation. The RAM 906 temporarily or perpetually stores, for example, a program to be read by the CPU 902 or various parameters or the like appropriately changed in execution of the program.

These structural elements are connected to each other by, for example, the host bus 908 capable of performing high-speed data transmission. For its part, the host bus 908 is connected through the bridge 910 to the external bus 912 whose data transmission speed is relatively low, for example. Furthermore, the input unit 916 is, for example, a mouse, a keyboard, a touch panel, a button, a switch, or a lever. Also, the input unit 916 may be a remote controller that can transmit a control signal by using an infrared ray or other radio waves.

The output unit 918 is, for example, a display device such as a CRT, an LCD, a PDP or an ELD, an audio output device such as a speaker or headphones, a printer, a mobile phone, or a facsimile, that can visually or auditorily notify a user of acquired information. The CRT is an abbreviation for Cathode Ray Tube. In addition, the LCD is an abbreviation for Liquid Crystal Display. The PDP is an abbreviation for Plasma Display Panel. Also, the ELD is an abbreviation for Electro-Luminescence Display.

The storage unit 920 is a device for storing various data. The storage unit 920 is, for example, a magnetic storage device such as a hard disk drive (HDD), a semiconductor storage device, an optical storage device, or a magneto-optical storage device. The HDD is an abbreviation for Hard Disk Drive.

The drive 922 is a device that reads information recorded on the removable recording medium 928, for example, a magnetic disk, an optical disc, a magneto-optical disc, or a semiconductor memory, or writes information in the removable recording medium 928. The removable recording medium 928 is, for example, a DVD medium, a Blu-ray medium, an HD-DVD medium, various types of semiconductor storage media, or the like. Of course, the removable recording medium 928 may be, for example, an electronic device or an IC card on which a non-contact IC chip is mounted. The IC is an abbreviation for Integrated Circuit.

The connection port 924 is, for example, a USB port, an IEEE1394 port, a SCSI, an RS-232C port, or a port for connecting an externally connected device 930 such as an optical audio terminal. The externally connected device 930 is, for example, a printer, a mobile music player, a digital camera, a digital video camera, or an IC recorder. The USB is an abbreviation for Universal Serial Bus. Also, the SCSI is an abbreviation for Small Computer System Interface.

The communication unit 926 is a communication device to be connected to a network 932, and is, for example, a communication card for a wired or wireless LAN, Bluetooth (registered trademark), or WUSB, an optical communication router, an ADSL router, or a device for contact or non-contact communication. In addition, the network 932 connected to the communication unit 926 is configured from a wire-connected or wirelessly connected network, and is the Internet, a home-use LAN, infrared communication, visible light communication, broadcasting, or satellite communication, for example. The LAN is an abbreviation for Local Area Network. Also, the WUSB is an abbreviation for Wireless USB. Furthermore, the ADSL is an abbreviation for Asymmetric Digital Subscriber Line.

3. CONCLUSION

According to the embodiments of the present disclosure described above, the communication device 100 that effectively monitors the network in a network system constituted by a plurality of communication devices, particularly, in a network system constituted by communication devices that process video data and audio data, is provided.

The communication device 100 according to the embodiments of the present disclosure generates control information to be used in operations of the network monitoring function, sets a value in a register based on the control information, and transmits the control information to another communication device 100 serving as a counterpart in a communication flow. The other communication device 100 which has received the control information generates a register value appropriate for the device itself and sets the value in the register.

The communication device 100 according to the embodiments of the present disclosure can effectively monitor the network in the network system constituted by the plurality of communication devices 100, particularly, the network system constituted by the communication devices 100 that process video data and audio data by transmitting the generated control information to another communication device 100.

It may not be necessary to chronologically execute respective steps in the processing, which is executed by each device of this specification, in the order described in the sequence diagrams or the flow charts. For example, the respective steps in the processing which is executed by each device may be processed in the order different from the order described in the flow charts, and may also be processed in parallel.

Furthermore, it becomes possible to generate a computer program which makes a hardware device, such as a CPU, a ROM, and a RAM incorporated in each device demonstrate the functions equivalent to the configurations of the above described devices. In addition, it becomes also possible to provide a storage medium which stores the computer program. In addition, respective functional blocks shown in the functional block diagrams may be constituted from hardware devices so that a series of processes may be implemented by the hardware devices.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effect described in the present specification is not limited to only that described or illustrated. That is, the technology according to the present disclosure accomplishes other effects which are clear to a person skilled in the art from the description of the present specification, along with the above described effect or instead of the above described effect.

Additionally, the present technology may also be configured as below.

(1) A communication device, including:

a packet collection unit configured to collect packets transmitted to a network and packets received from the network;

a packet detection unit configured to detect whether or not a packet that is an opportunity to generate instruction information for instructing start and stop of recording packets exists by using the packets collected by the packet collection unit;

a control information generation unit configured to generate information for use in monitoring operation of packets and control information including the instruction information; and a communication control unit configured to transmit the control information generated by the control information generation unit to another device connected to the network.

(2) The communication device according to (1), wherein the control information generation unit generates the control information including information of packets to be recorded and information of packets to be counted.

(3) The communication device according to (1) or (2), wherein the packet detection unit includes a recorded packet selection unit configured to select packets to be recorded from the packets collected by the packet collection unit, a recording control unit configured to record a part designated by the packets selected by the recorded packet selection unit, a counted packet selection unit configured to select packets to be counted from the packets collected by the packet collection unit, and a counting control unit configured to count the packets selected by the counted packet selection unit.

(4) The communication device according to (3), further including a recorded information processing unit configured to organize information of the packets collected by the packet collection unit and output the information.

(5) The communication device according to (4), wherein the recorded information processing unit puts packet recorded information that is information of the packets recorded by the recording control unit, packet counting information that is information of the packets counted by the counting control unit, and packet recorded information and packet counting information collected by another device in order of generation.

(6) The communication device according to any of (3) to (5), wherein the recorded packet selection unit includes a combination of one or more filters that select packets to be recorded by determining matching or non-matching of the packets collected by the packet collection unit with a designated pattern.

(7) The communication device according to any of (3) to (6), wherein the counted packet selection unit includes a combination of one or more filters that select packets to be counted by determining matching or non-matching of the packets collected by the packet collection unit with a designated pattern.

(8) The communication device according to any of (3) to (7), wherein the recording control unit selects a relative time in which a time at which an instruction to start recording packets is generated is defined to be a reference time and performs control so that the relative time and the packets are recorded at the same time.

(9) The communication device according to any of (1) to (8), wherein the communication control unit ascertains allowing of remote control based on the control information to the another device.

(10) The communication device according to any of (1) to (9), wherein, when the instruction information is transmitted to the another device, the communication control unit generates packets in which a network address of the another device is set and transmits the packets to a device different from the another device.

(11) A packet monitoring method, including:

collecting packets transmitted to a network and packets received from the network;

detecting whether or not a packet that is an opportunity to generate instruction information for instructing start and stop of recording packets exists by using the collected packets;

generating information for use in monitoring operation of packets and control information including the instruction information; and transmitting the generated control information to another device connected to the network.

(12) A computer program causing a computer to execute:

collecting packets transmitted to a network and packets received from the network;

detecting whether or not a packet that is an opportunity to generate instruction information for instructing start and stop of recording packets exists by using the collected packets;

generating information for use in monitoring operation of packets and control information including the instruction information; and transmitting the generated control information to another device connected to the network.

REFERENCE SIGNS LIST 100 communication device
110 network interface
111 packet collection unit
112 communication control unit
113 information processing unit
114 control information processing unit
115 control information generation unit
116 memory control unit
117 memory
118 counter control unit
119 counter
120 packet filter unit
130 recorded information processing unit
131 recorded information communication processing unit

The invention claimed is:

1. A communication device, comprising:
circuitry configured to:
obtain a first plurality of packets from a network interface,
wherein at least one packet of the first plurality of packets is one of transmitted to a network or received from the network;
generate control information that comprises monitoring information and instruction information,
wherein the monitoring information indicates a monitoring operation of the first plurality of packets, and
wherein the instruction information includes instructions to one of start a recording operation of the first plurality of packets or stop the recording operation of the first plurality of packets;
select a second plurality of packets from the first plurality of packets;
record the second plurality of packets based on the generated control information,
wherein the second plurality of packets comprises undesignated patterns;

select a third plurality of packets from the first plurality of packets; and count the third plurality of packets based on the generated control information, wherein the third plurality of packets comprises the undesignated patterns;

transmit the control information to a first device connected to the network;

determine an allowance state of remote control of the first device based on the transmitted control information; and transmit the generated control information to the first device based on the determined allowance state of the remote control that is set.

2. The communication device according to claim 1, wherein the generated control information further comprises first information of the second plurality of packets and second information of the third plurality of packets.

3. The communication device according to claim 2, wherein the circuitry is further configured to:

organize the first information and the second information, and output the first information and the second information.

4. The communication device according to claim 1, wherein the circuitry is further configured to:

obtain third information of the second plurality of packets from a first device;

obtain fourth information of the third plurality of packets from the first device; and organize the first information, the second information, the third information, and the fourth information based on the generated control information.

5. The communication device according to claim 1, further comprising at least one filter configured to select the first second plurality of packets from the first plurality of packets, wherein the at least one filter is configured to select the second plurality of packets based on a match of the first plurality of packets with a designated pattern.

6. The communication device according to claim 1, further comprising at least one filter configured to select the third plurality of packets from the first plurality of packets, wherein the at least one filter is configured to select the third plurality of packets based on a match of the first plurality of packets with a designated pattern.

7. The communication device according to claim 1, wherein the circuitry is further configured to:

select a time at which an instruction to start the recording operation of the first plurality of packets is generated; and control the selected time to match a recording time of the first plurality of packets.

8. The communication device according to claim 1, wherein the circuitry is further configured to:

transmit the instruction information to the first device;

generate a fourth plurality of packets from the first plurality of packets based on the transmitted instruction information, wherein the fourth plurality of packets comprises a network address of the first device; and transmit the fourth plurality of packets to a second device that is different from the first device.

9. The communication device according to claim 1, wherein the circuitry is further configured to detect a trigger packet from the first plurality of packets, and wherein the trigger packet is associated with the instruction information.

10. A packet monitoring method, comprising:

obtaining a first plurality of packets from a network interface, wherein at least one packet of the first plurality of packets is one of transmitted to a network or received from the network;

generating control information that comprises monitoring information and instruction information, wherein the monitoring information indicates a monitoring operation of the first plurality of packets, and wherein the instruction information includes instructions for one of start a recording operation of the first plurality of packets or stop the recording operation of the first plurality of packets;

selecting a second plurality of packets from the first plurality of packets;

recording the second plurality of packets based on the generated control information, wherein the second plurality of packets comprise undesignated patterns;

selecting a third plurality of packets from the first plurality of packets; and counting the third plurality of packets based on the generated control information, wherein the third plurality of packets comprise the undesignated patterns transmitting the control information to a device connected to the network;

determining an allowance state of remote control of the device based on the transmitted control information; and transmitting the generated control information to the device based on the determined allowance state of the remote control that is set.

11. A non-transitory computer-readable medium having stored thereon computer-readable instructions, which when executed by a computer, cause the computer to execute operations, the operations comprising:

obtaining a first plurality of packets from a network interface, wherein at least one packet of the first plurality of packets is one of transmitted to a network or received from the network;

generating control information that comprises monitoring information and instruction information, wherein the monitoring information indicates a monitoring operation of the first plurality of packets, and wherein the instruction information includes instructions for one of start a recording operation of the first plurality of packets or stop the recording operation of the first plurality of packets;

selecting a second plurality of packets from the first plurality of packets;

recording the second plurality of packets based on the generated control information, wherein the second plurality of packets comprise undesignated patterns;

selecting a third plurality of packets from the first plurality of packets; and counting the third plurality of packets based on the generated control information, wherein the third plurality of packets comprise the undesignated patterns transmitting the control information to a device connected to the network; and determining an allowance state of remote control of the device based on the transmitted control information; and transmitting the generated control information to the device based on the determined allowance state of the remote control that is set.

* * * * *